US009588679B2

(12) United States Patent
Rakow et al.

(10) Patent No.: US 9,588,679 B2
(45) Date of Patent: Mar. 7, 2017

(54) VIRTUAL VIEWPORT AND FIXED POSITIONING WITH OPTICAL ZOOM

(75) Inventors: Matthew A. Rakow, Seattle, WA (US); Sergey Z. Malkin, Redmond, WA (US); Michael J. Ens, Redmond, WA (US); Yining Chen, Bellevue, WA (US); Christian Fortini, Sammamish, WA (US); Sandra G. Roberts, Bothell, WA (US); Michael J. Patten, Sammamish, WA (US); Nicholas R. Waggoner, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 433 days.

(21) Appl. No.: 13/230,473

(22) Filed: Sep. 12, 2011

(65) Prior Publication Data
US 2013/0067315 A1 Mar. 14, 2013

(51) Int. Cl.
*G06F 17/00* (2006.01)
*G06F 3/0488* (2013.01)
(52) U.S. Cl.
CPC ...... *G06F 3/04886* (2013.01); *G06F 3/04883* (2013.01); *G06F 2203/04806* (2013.01)
(58) Field of Classification Search
CPC .... G06F 17/2247; G06F 17/24; G06F 17/211; G06F 17/212; G06F 17/248; G06F 17/217
USPC ............... 715/234, 243, 236, 246, 247, 253
See application file for complete search history.

(56) References Cited

U.S. PATENT DOCUMENTS

| 6,848,082 | B1 | 1/2005 | Patel et al. |
| 7,386,806 | B2 | 6/2008 | Wroblewski |
| 7,496,484 | B2 | 2/2009 | Agrawala et al. |
| 7,536,654 | B2 | 5/2009 | Anthony et al. |

(Continued)

FOREIGN PATENT DOCUMENTS

| CN | 101211336 A | 7/2008 |
| EP | 2256609 A2 | 12/2010 |
| WO | 2010063014 A1 | 6/2010 |

OTHER PUBLICATIONS

Peter-Paul Koch, A Tale of Two Viewports—Part Two, Aug. 18, 2011, http://web.archive.org/web/20110818031626/http://www.quirksmode.org/mobile/viewports2.html.*

(Continued)

*Primary Examiner* — Scott Baderman
*Assistant Examiner* — Seung Jung
(74) *Attorney, Agent, or Firm* — Bryan Webster; Dan Choi; Micky Minhas

(57) ABSTRACT

Various embodiments utilize a layout viewport and a visual viewport separate from the layout viewport. The layout viewport is utilized for such things as page layout operations and reporting Document Object Model values to script. The layout viewport can be thought of as an initial rectangle which is equivalent in size to the initial containing block. The initial containing block is a containing block that contains web content that is initially visible to the user. The visual viewport is separate from the layout viewport and is allowed to be freely manipulated relative to the layout viewport. For example, the visual viewport may "push" the layout viewport around when it collides with the layout viewport boundaries. The visual viewport can be thought of as the rectangle that is visible to the user.

21 Claims, 23 Drawing Sheets

(56) References Cited

U.S. PATENT DOCUMENTS

| | | | |
|---|---|---|---|
| 7,900,158 B2* | 3/2011 | Ngari et al. | 715/801 |
| 8,345,008 B2* | 1/2013 | Lee et al. | 345/168 |
| 8,555,157 B1* | 10/2013 | Fu | 715/234 |
| 2006/0200752 A1 | 9/2006 | Sellers et al. | |
| 2007/0033543 A1 | 2/2007 | Ngari et al. | |
| 2007/0263007 A1* | 11/2007 | Robotham et al. | 345/581 |
| 2010/0029255 A1* | 2/2010 | Kim et al. | 455/414.2 |
| 2010/0079498 A1 | 4/2010 | Zaman et al. | |
| 2010/0229130 A1 | 9/2010 | Edge et al. | |
| 2011/0035701 A1 | 2/2011 | Williams et al. | |
| 2011/0035702 A1 | 2/2011 | Williams et al. | |
| 2011/0215914 A1 | 9/2011 | Edwards | |
| 2013/0014007 A1* | 1/2013 | Kopp et al. | 715/243 |
| 2013/0047079 A1* | 2/2013 | Kroeger et al. | 715/273 |
| 2013/0088519 A1* | 4/2013 | Cristescu et al. | 345/667 |

OTHER PUBLICATIONS

Peter-Paul Koch, A tale of two viewports—part one, Aug. 18, 2011, http://web.archive.org/web/20110818031626/http://www.quirksmode.org/mobile/viewports.html.*

Simon Edstrom, Improving Web Browsing on Mobile Devices Using Focus and Zooming, p. 26-36, Jun. 2010, Umea University, Sweden.*

Rune Lillesveen, W3C: CSS Device Adaptation, Editor's Draft Nov. 2, 2010, http://web.archive.org/web/20101224084333/http://dev.w3.org/csswg/css-device-adapt/.*

Jblas et al, "Fixed Headers/Footers Scroll with the document occassionally.", a blog started on Sep. 23, 2010, Github Inc., pp. 1-11.*

Peter-Paul Koch, The fifth position value, Dec. 7, 2010, QuirksBlog, could be found in http://www.quirksmode.org/blog/archives/2010/12/the_fifth_posit.html, pp. 1-4.*

David Bokan, Chrome Viewports found at https://docs.google.com/presentation/d/1nJvJqL2dw5STi5FFpR6tP371vSpDWWs5Beksbfitpzc/edit#slide=id.g35686bbd1_00, Jun. 23, 2014, pp. 1-11.*

"International Search Report", Mailed Date: Feb. 20, 2013, Application No. PCT/US2012/054393, Filed Date: Sep. 10, 2012, pp. 8.

"Internet Explorer 8 RC 1", Retrieved at <<http://www.techfiles.de/presse/DPM/IE8_RC1_Reviewers_Guide.pdf>>, Jan. 2009, pp. 113.

"First Office Action and Search Report Issued in Chinese Patent Application No. 201210335705.X", Mailed Date: Sep. 25, 2014, 8 Pages.

"Supplementary Search Report Issued in European Patent Application No. 12832024.9", Mailed Date: May 7, 2015, 8 Pages.

Peter-Paul, Koch, "The Fifth Position Value—QuirksBlog", Retrieved from <<http://www.quirksmode.org/blog/archives/2010/12/the_fifth_posit.html, Dec. 7, 2010, 11 Pages.

"Second Office Action and Search Report Issued in Chinese Patent Application No. 201210335705.X", Mailed Date: May 25, 2015, 12 Pages.

"Third Office Action and Search Report Issued in Chinese Patent Application No. 201210335705.X", Mailed Date: Nov. 19, 2015, 17 Pages.

* cited by examiner

VIRTUAL VIEWPORT AND FIXED POSITIONING WITH OPTICAL ZOOM

BACKGROUND

Many touch-capable web browsers allow the user to zoom webpages utilizing a gesture, such as a pinch gesture. Typically, the zoom functionality is implemented as an optical stretch of the page, referred to as an "optical zoom." By definition, this conflicts with W3C standards which require the page to re-layout based on the visible region.

Many web browsers basically just ignore this standards requirement. This, in turn, implies that other features stop working or can work differently than expected. These include fixed-position elements and backgrounds, (Document Object Model) DOM values reported in script, and other aspects of page layout. This results in compatibility issues with websites which use these features, often to the extent that the sites are forced to create special versions for certain browsers or devices to avoid broken functionality.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments utilize a layout viewport and a visual viewport separate from the layout viewport. The layout viewport is utilized for such things as page layout operations and reporting Document Object Model values to script. The layout viewport can be thought of as an initial rectangle which is equivalent in size to the initial containing block. The initial containing block is a containing block the contains web content that is initially visible to the user. The visual viewport is separate from the layout viewport and is allowed to be freely manipulated relative to the layout viewport. For example, the visual viewport may "push" the layout viewport around when it collides with the layout viewport boundaries. The visual viewport can be thought of as the rectangle that is visible to the user.

In one or more embodiments, fixed elements are fixed to the layout viewport and the visual viewport can pan independently of the layout viewport. When the visual viewport reaches the edge of the layout viewport, the layout viewport can begin to pan with it.

In one or more embodiments, viewports can be modified independently. For example, the size of the visual viewport can be modified to accommodate overlay user interfaces such as on-screen touch keyboards. This can enable additional scenarios such as touch input within fixed elements, and panning/zooming fixed elements while the keyboard is visible.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments utilize a layout viewport and a visual viewport separate from the layout viewport. The layout viewport is utilized for such things as page layout operations and reporting Document Object Model values to script. The layout viewport can be thought of as an initial rectangle which is equivalent in size to the initial containing block. The initial containing block is a containing block the contains web content that is initially visible to the user. The visual viewport is separate from the layout viewport and is allowed to be freely manipulated relative to the layout viewport. For example, the visual viewport may "push" the layout viewport around when it collides with the layout viewport boundaries. The visual viewport can be thought of as the rectangle that is visible to the user.

In one or more embodiments, fixed elements are fixed to the layout viewport and the visual viewport can move, for example, pan independently of the layout viewport. When the visual viewport reaches the edge of the layout viewport, the layout viewport can begin to pan with it.

In one or more embodiments, viewports can be modified independently. For example, the size of the visual viewport can be modified to accommodate overlay user interfaces such as on-screen touch keyboards. This can enable additional scenarios such as touch input within fixed elements, and panning/zooming fixed elements while the keyboard is visible.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Environment

Figure 1:
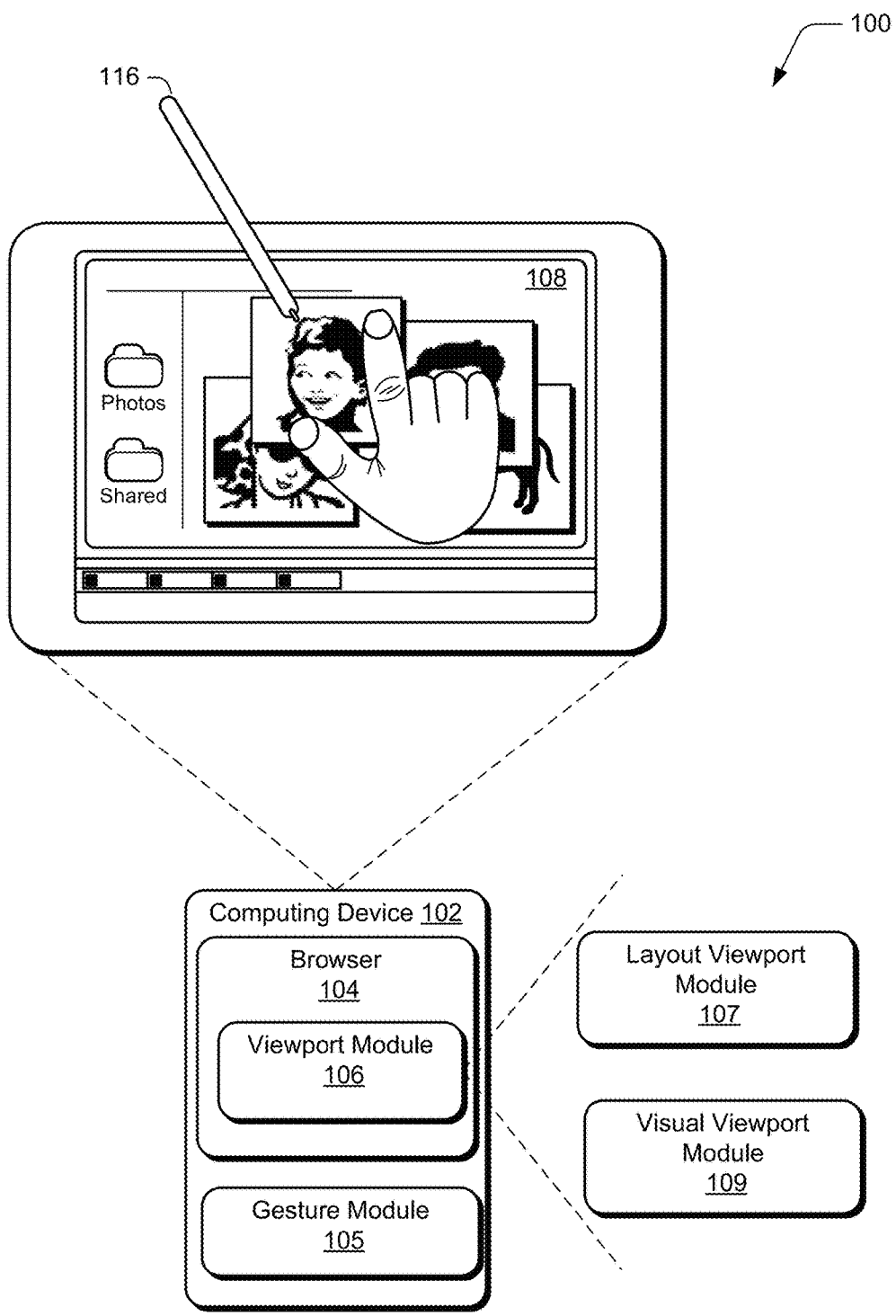
FIG. 1 is an illustration of an environment in an example implementation in accordance with one or more embodiments.

FIG. 1 is an illustration of an environment 100 in an example implementation that is operable to employ the animation techniques described in this document. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes a web browser 104 to provide functionality as described in this document. The web browser can be implemented in connection with any suitable type of hardware, software, firmware or combination thereof. In at least some embodiments, the web browser is implemented in software that resides on some type of tangible, computer-readable storage medium examples of which are provided below.

Web browser 104 is representative of functionality that enables the user to browse to different websites and consume content associated with those websites. As will be described below in detail, web browser 104 includes a viewport module 106 that includes a layout viewport module 107 and a visual viewport module 109. It is to be appreciated and understood that while the viewport module is shown as part of the web browser, the viewport module can be a standalone module that can be utilized by the web browser 104 or other applications. Alternately or additionally, the viewport module 106 can comprise part of an application or applications other than web browser 104.

The layout viewport module 107 implements a layout viewport that is utilized for such things as page layout operations and reporting Document Object Model values to script. The layout viewport can be thought of as an initial rectangle which is equivalent in size to the initial containing block that contains web content that is initially visible to the user.

The visual viewport module 109 implements a visual viewport that is separate from the layout viewport and is allowed to be freely manipulated relative to the layout viewport. For example, the visual viewport may "push" the layout viewport around when it collides with the layout viewport boundaries. The visual viewport can be thought of as the rectangle that is visible to the user.

In one or more embodiments, fixed elements are fixed to the layout viewport and the visual viewport can pan independently of the layout viewport. When the visual viewport reaches the edge of the layout viewport, the layout viewport can begin to pan with it.

In one or more embodiments, viewports can be modified independently. For example, the size of the visual viewport can be modified to accommodate overlay user interfaces such as on-screen touch keyboards. This can enable additional scenarios such as touch input within fixed elements, and panning/zooming fixed elements while the keyboard is visible, as will become apparent below.

Computing device 102 also includes a gesture module 105 that recognizes gestures that can be performed by one or more fingers, and causes operations to be performed that correspond to the gestures. The gestures may be recognized by module 105 in a variety of different ways. For example, the gesture module 105 may be configured to recognize a touch input, such as a finger of a user's hand as proximal to display device 108 of the computing device 102 using touchscreen functionality. Module 105 can be utilized to recognize single-finger gestures and bezel gestures, multiple-finger/same-hand gestures and bezel gestures, and/or multiple-finger/different-hand gestures and bezel gestures.

The computing device 102 may also be configured to detect and differentiate between a touch input (e.g., provided by one or more fingers of the user's hand) and a stylus input (e.g., provided by a stylus 116). The differentiation may be performed in a variety of ways, such as by detecting an amount of the display device 108 that is contacted by the finger of the user's hand versus an amount of the display device 108 that is contacted by the stylus 116.

Thus, the gesture module 105 may support a variety of different gesture techniques through recognition and leverage of a division between stylus and touch inputs, as well as different types of touch inputs.

Figure 2:
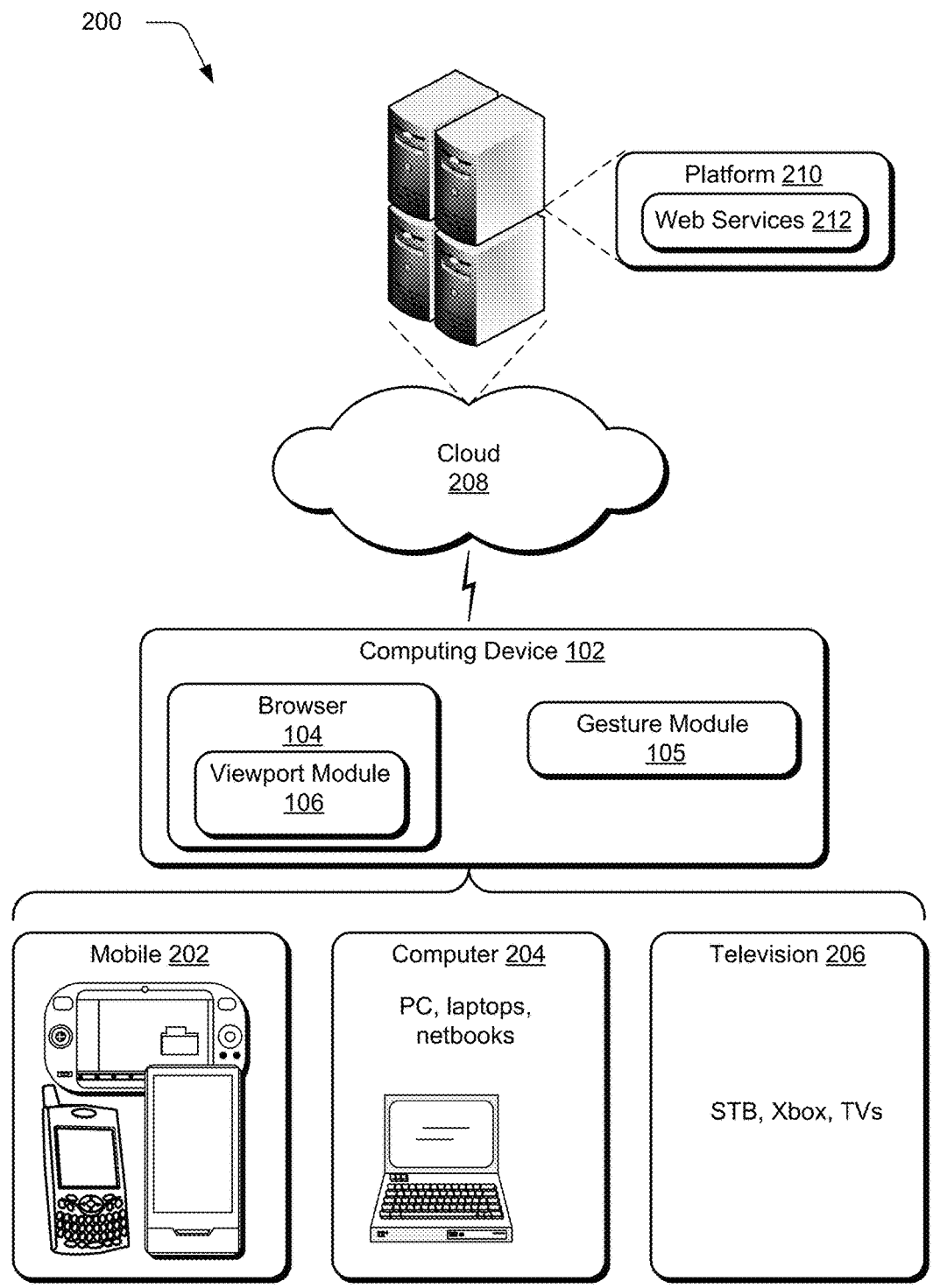
FIG. 2 is an illustration of a system in an example implementation showing FIG. 1 in greater detail.

FIG. 2 illustrates an example system 200 showing the browser 104, gesture module 105, and viewport module 106 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

The gesture techniques supported by the gesture module may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe example embodiments. A section entitled "Example Viewport Interactions" describes a number of scenarios that show interaction between a visual viewport and a layout viewport in accordance with one or more embodiments. Next, a section entitled "Example Method" describes an example method in accordance with one or more embodiments. Last, a section entitled "Example Device" describes aspects of an example device that can be utilized to implement one or more embodiments.

Having described example operating environments in which the browser can be utilized, consider now a discussion of an example browser and, in particular, example viewport interactions in accordance with one or more embodiments.

Example Viewport Interactions

Figure 3:
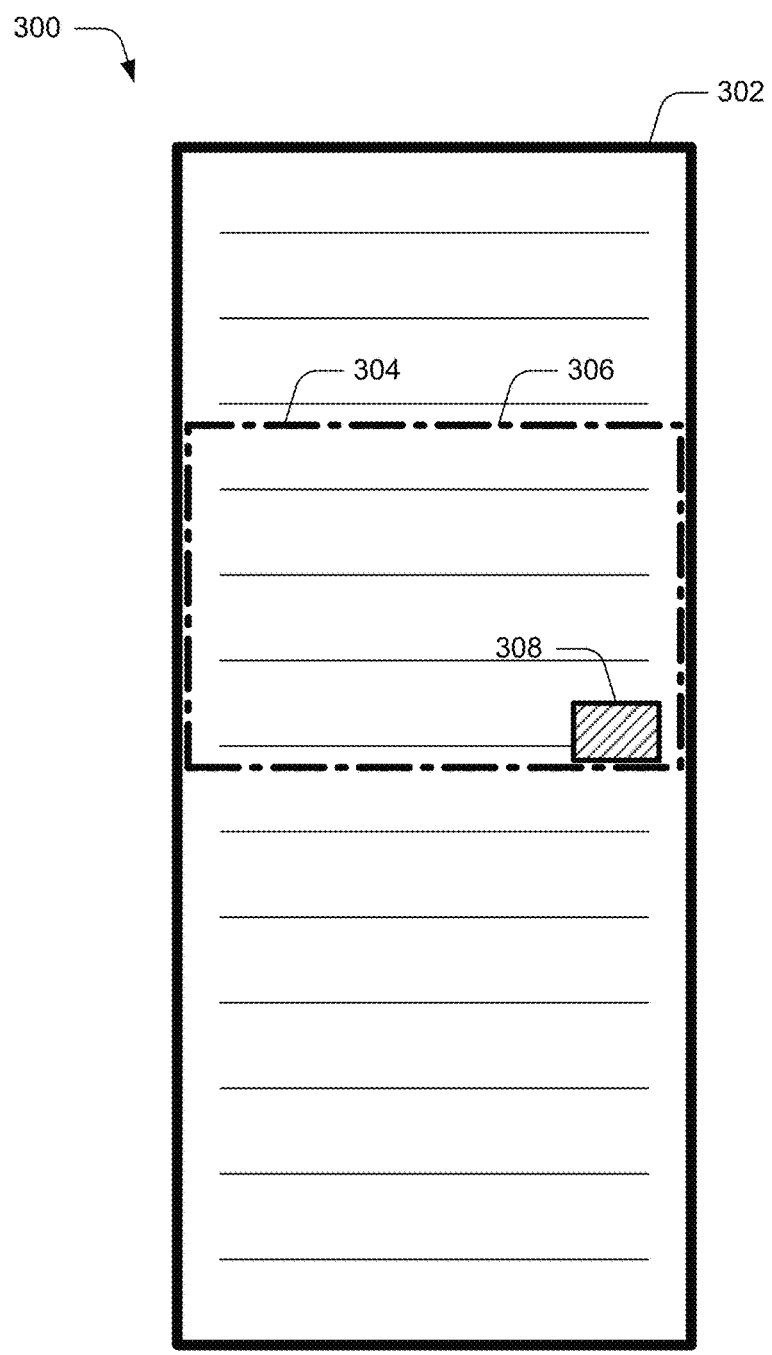
FIG. 3 illustrates a view of a renderable document illustrating a layout viewport and a visual viewport in accordance with one or more embodiments.

FIG. 3 illustrates what can be considered as an omniscient view, generally at 300, of a renderable document 302. The view is "omniscient" because it represents both content that is currently visible to a user as defined by a visual viewport, and content that, as represented in the figure, is not currently visible to the user. In the illustrated and described embodiment, the optical zoom level determines the size of the visual viewport. Additionally, the visual viewport determines content of the renderable document that is shown to the user, as will become apparent below.

Specifically, in this example a layout viewport is illustrated at 304 by the long dashed lines. A visual viewport 306 is illustrated by the thin dashed lines. In this particular example, when the page loads, the layout viewport 304 and the visual viewport 306 initially have the same aspect ratio. Because of this, the layout viewport 304 and visual viewport 306 are initially coextensive. In addition, view 300 includes a so-called fixed position element 308. The fixed position element is laid out relative to and fixed within the layout viewport 304. For purposes of the ongoing examples to follow, consider the fixed position element as a social networking chat box, such as one might find on Facebook.

Recall that the layout viewport is utilized for such things as page layout operations and reporting Document Object Model (DOM) values to script. The DOM is used by a layout pipeline to build, in at least some embodiments, a renderable display tree which can then be rendered by a display module into content that can be viewed by a user via a web browser or other suitably configured application. The layout viewport 304 can be thought of as an initial rectangle which is equivalent in size to the initial containing block. The initial containing block is a containing block that contains web content that is initially visible to the user. The visual viewport 306 is separate from the layout viewport 304 and is allowed to be freely manipulated relative to the layout viewport 304. Content in the omniscient view 300 that lies outside the visual viewport 306 is not visible to the user. Rather, it appears in the figures to provide the reader with context for the interactions between the various viewports, as will be described below.

In the illustrated and described embodiment, the layout viewport 304 and the visual viewport 306 can have the following properties which contribute to and facilitate an organized, logical user experience in which content appears where a user would expect content to appear.

First, the visual viewport 306 is configured to appear within the layout viewport 304, as will become apparent below. Specifically, the visual viewport 306, in at least the illustrated and described embodiment, does not extend outside the layout viewport 304. It is possible, however, for the visual viewport to be larger than the layout viewport in some embodiments. In this case, the page would be zoomed out less than 100% and other content can be shown, e.g., whitespace, a page background color, a backdrop image, or the like. The visual viewport 306 is re-sizable within the layout viewport 304. This is so to accommodate zoom functionality, as well as other functionality. In particular instances, including those with overlay user interface elements, the visual viewport 306 is re-sizable to preserve the properties described just above. As noted above, elements are laid out relative to the layout viewport 304 and, when within the visual viewport 306, rendered with respect to the visual viewport 304.

As a user interacts with the visual viewport 306, positional relationships with respect to elements that have been laid out relative to the layout viewport 304 remain intact. Further, the layout viewport 304 is movable based on user interactions with the visual viewport 306. These principles and properties will become clearer in view of the description below.

Figure 4:
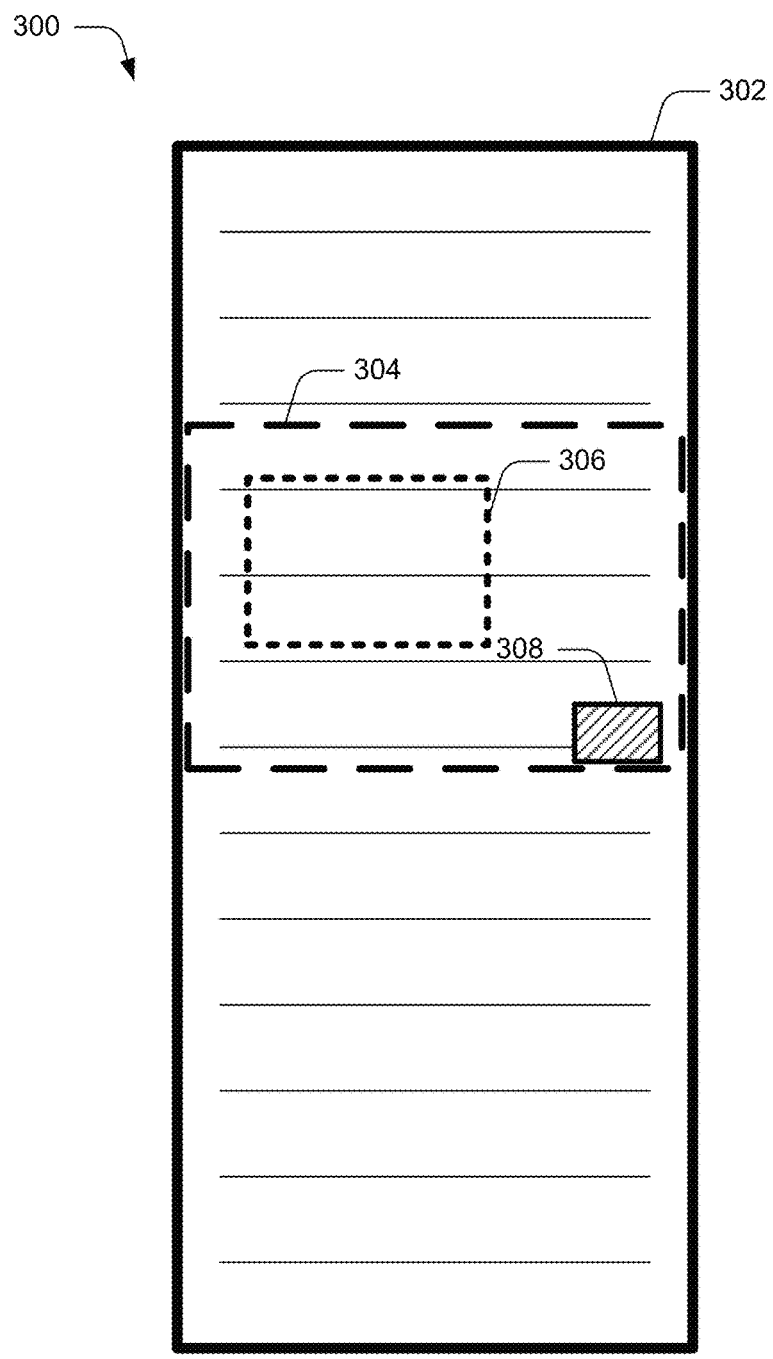
FIG. 4 illustrates a view of a renderable document illustrating a layout viewport and a visual viewport in accordance with one or more embodiments.

Referring to FIG. 4, the user has zoomed in on content as illustrated by the visual viewport 306 which now appears entirely within the layout viewport 304. Thus, as the user zooms in, the visual viewport becomes smaller and the content therewithin is magnified. In the illustrated and described embodiment, this zoom is implemented as an optical zoom. In an optical zoom, content is magnified without altering the layout of the page. Items that appear on a page are simply magnified. Because the user sees content that appears within the visual viewport 306, the fixed position element 308 is no longer visible. The fixed position element 308, however, remains positionally fixed relative to the layout viewport 304. In this particular example, because the user has not scrolled upward or downward with respect to content that lies outside of the layout viewport, no scroll events have been fired and the scroll offset has not changed. As will be appreciated by the skilled artisan, when a scroll event is fired, a callback to a scripting engine can occur which allows the scripting engine to update the DOM so that the updated DOM can be used to re-layout the content to build an updated display tree that can be rendered by the web browser.

Figure 5:
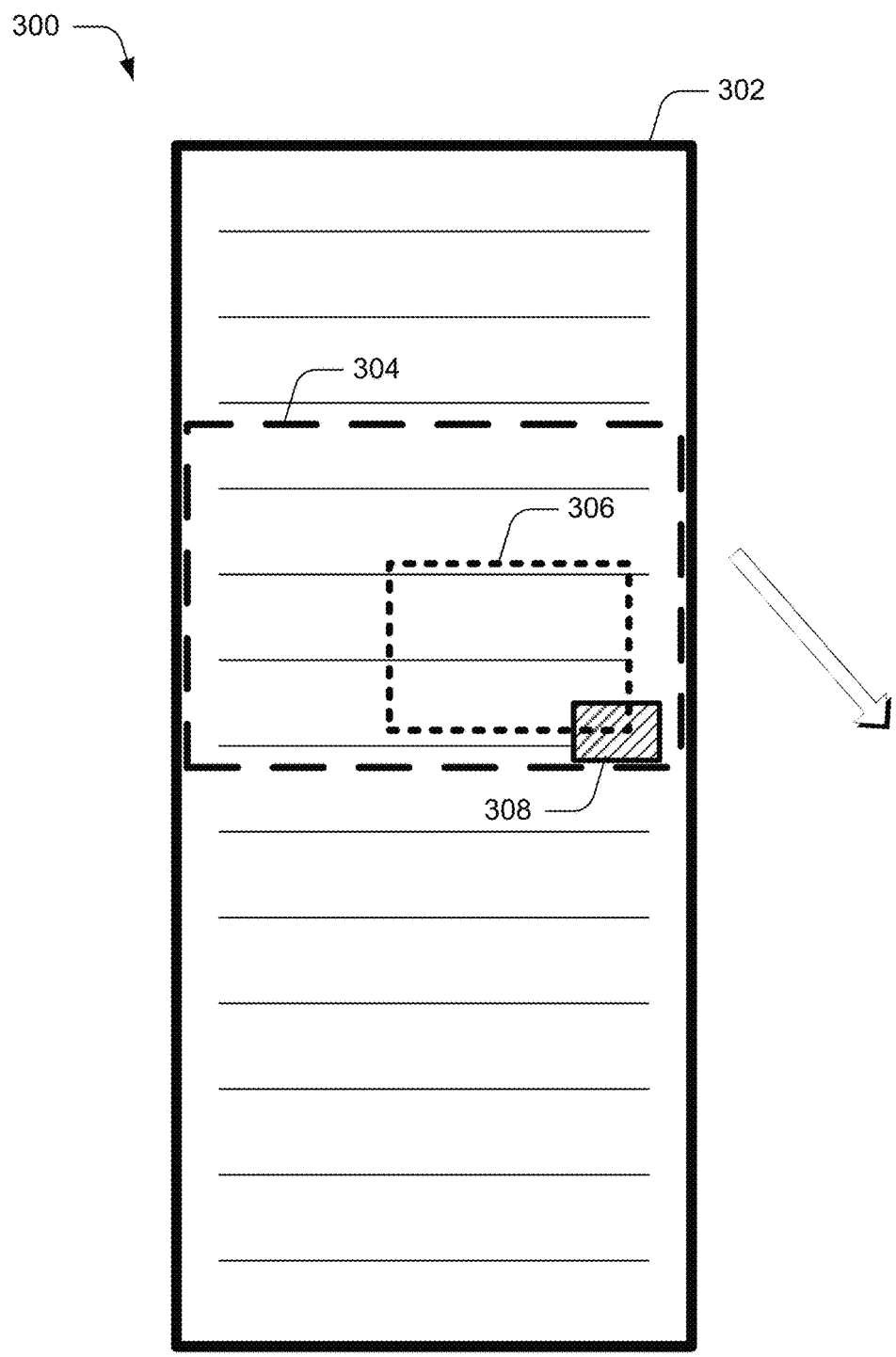
FIG. 5 illustrates a view of a renderable document illustrating a layout viewport and a visual viewport in accordance with one or more embodiments.

Referring to FIG. 5, the visual viewport 306 has been panned to the bottom right, in the direction of the arrow, to bring into view a portion of the fixed position element 308. Again, in this particular example, because the user has not scrolled upward or downward with respect to content that lies outside of the layout viewport, no scroll events have been fired and the scroll offset does not change.

Figure 6:
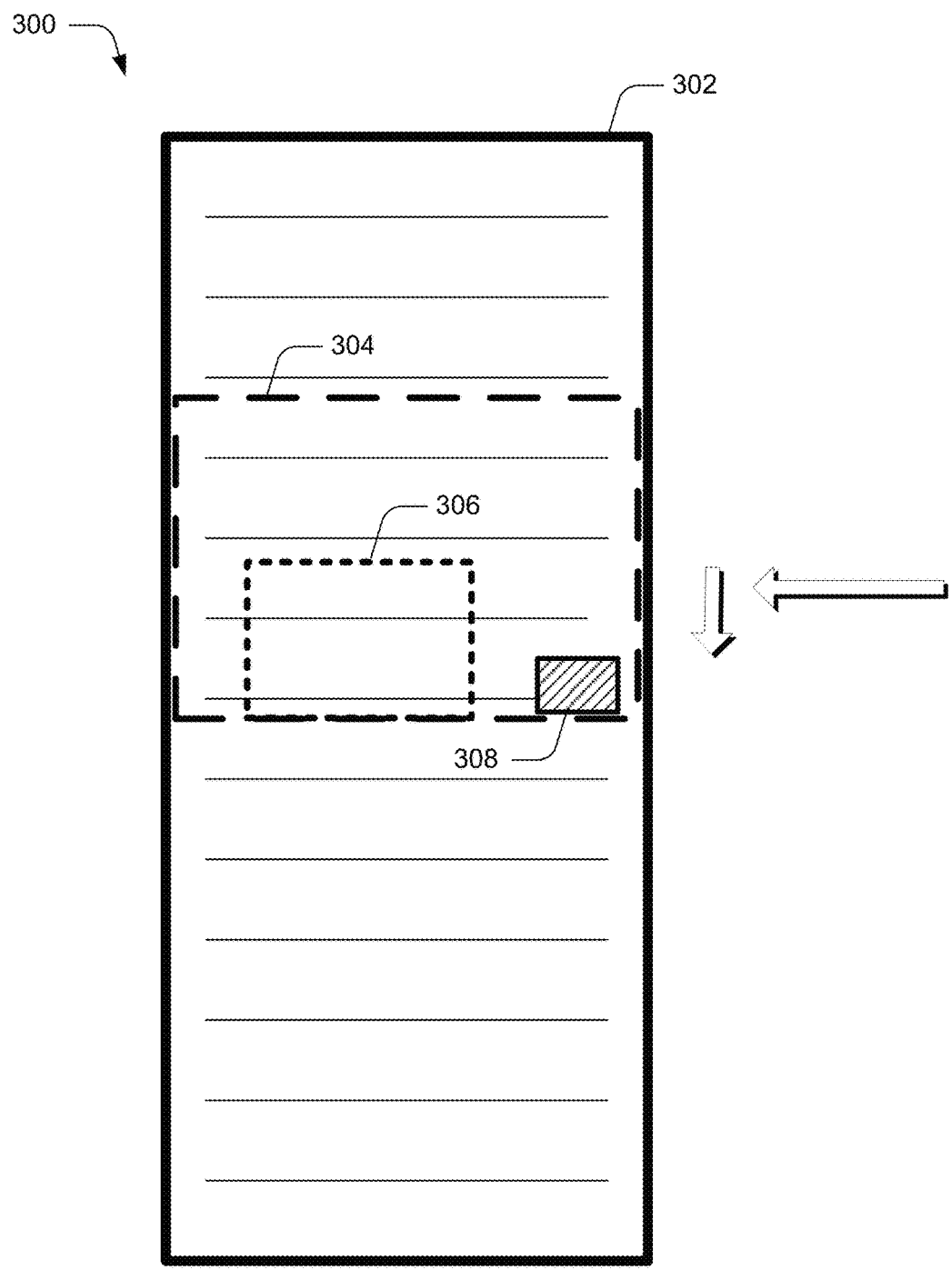
FIG. 6 illustrates a view of a renderable document illustrating a layout viewport and a visual viewport in accordance with one or more embodiments.

Referring to FIG. 6, the visual viewport 306 has been panned to the left of the fixed position element 308 and down to the bottom edge of the layout viewport 304 in the direction of the arrows. The fixed position element 308 is now not visible. At this point, because the user has not scrolled upward or downward with respect to content that lies outside of the layout viewport, no scroll events have been fired and the scroll offset does not change.

Figure 7:
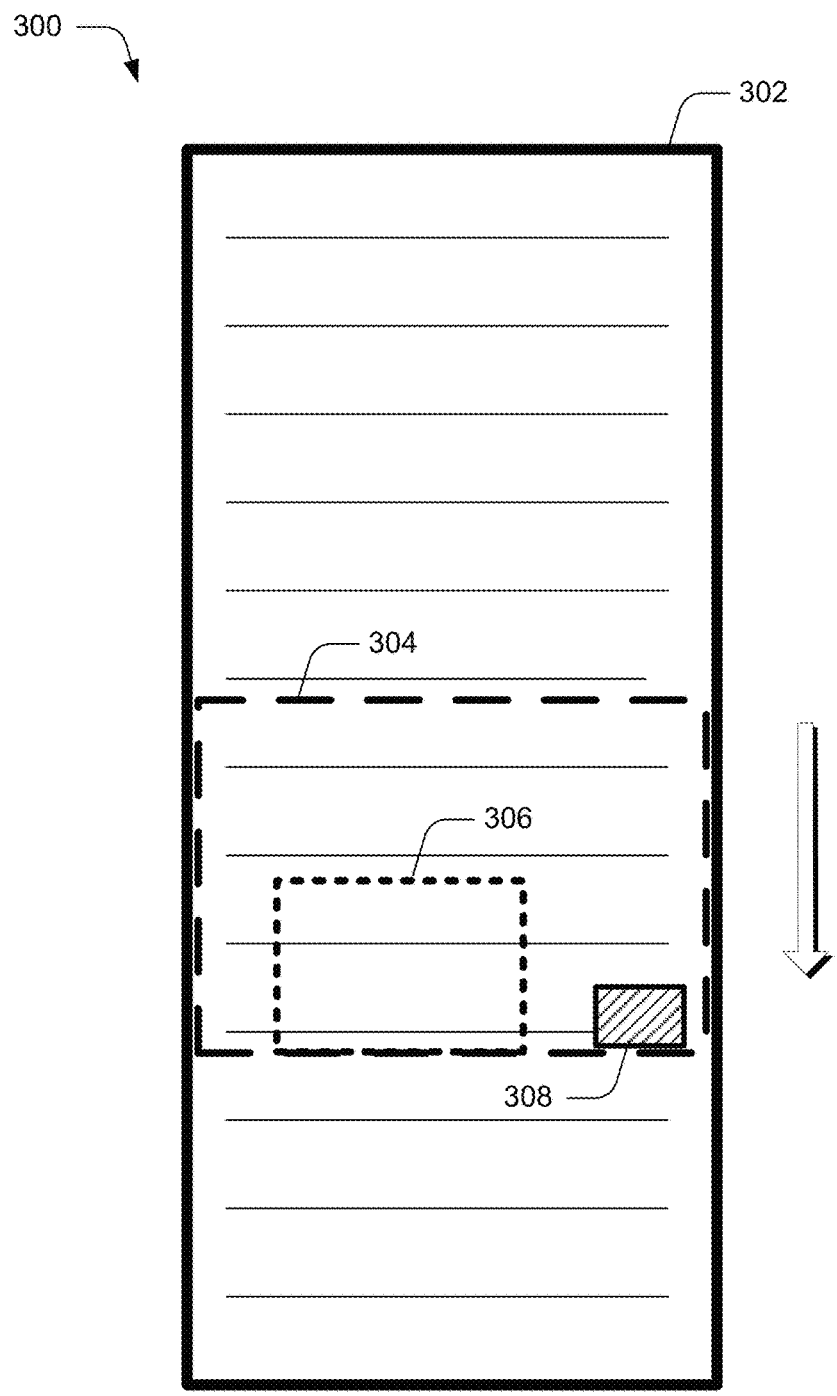
FIG. 7 illustrates a view of a renderable document illustrating a layout viewport and a visual viewport in accordance with one or more embodiments.

Referring to FIG. 7, the visual viewport 306 has been moved downward, in the direction of the arrow. In one or more embodiments, because the visual viewport 306 is configured to not extend outside of the layout viewport 304, movement in this direction which would otherwise cause the visual viewport 306 to cross over the boundary of the bottom of layout viewport 304 instead causes the layout viewport 304 to be moved or dragged along with the visual viewport. When this happens, scroll events are fired and the scroll offset is updated. Recall that by firing scroll events, the DOM can be updated which, in turn, can be used to build a renderable display tree to render the content that the user sees. In addition, the position of the fixed position element 308 is updated relative to the layout viewport 304. Again, this occurs through updates to the DOM.

Figure 8:
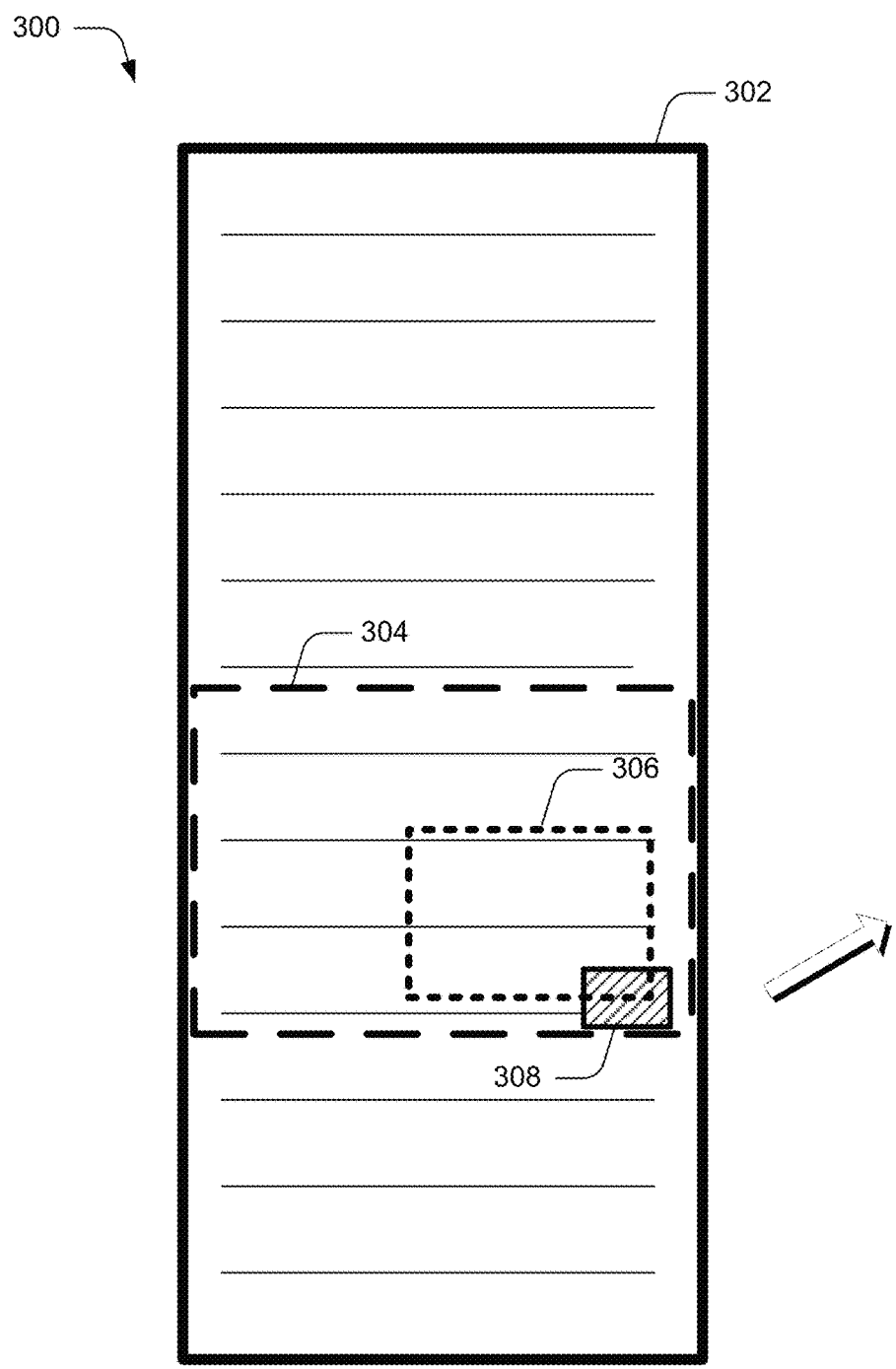
FIG. 8 illustrates a view of a renderable document illustrating a layout viewport and a visual viewport in accordance with one or more embodiments.

Referring to FIG. 8, the visual viewport 306 is panned upwardly to the right, in the direction of the arrow, such that a portion of the fixed position element 308 is shown. In this instance, no scroll events have been fired and the scroll offset does not change.

Figure 9:
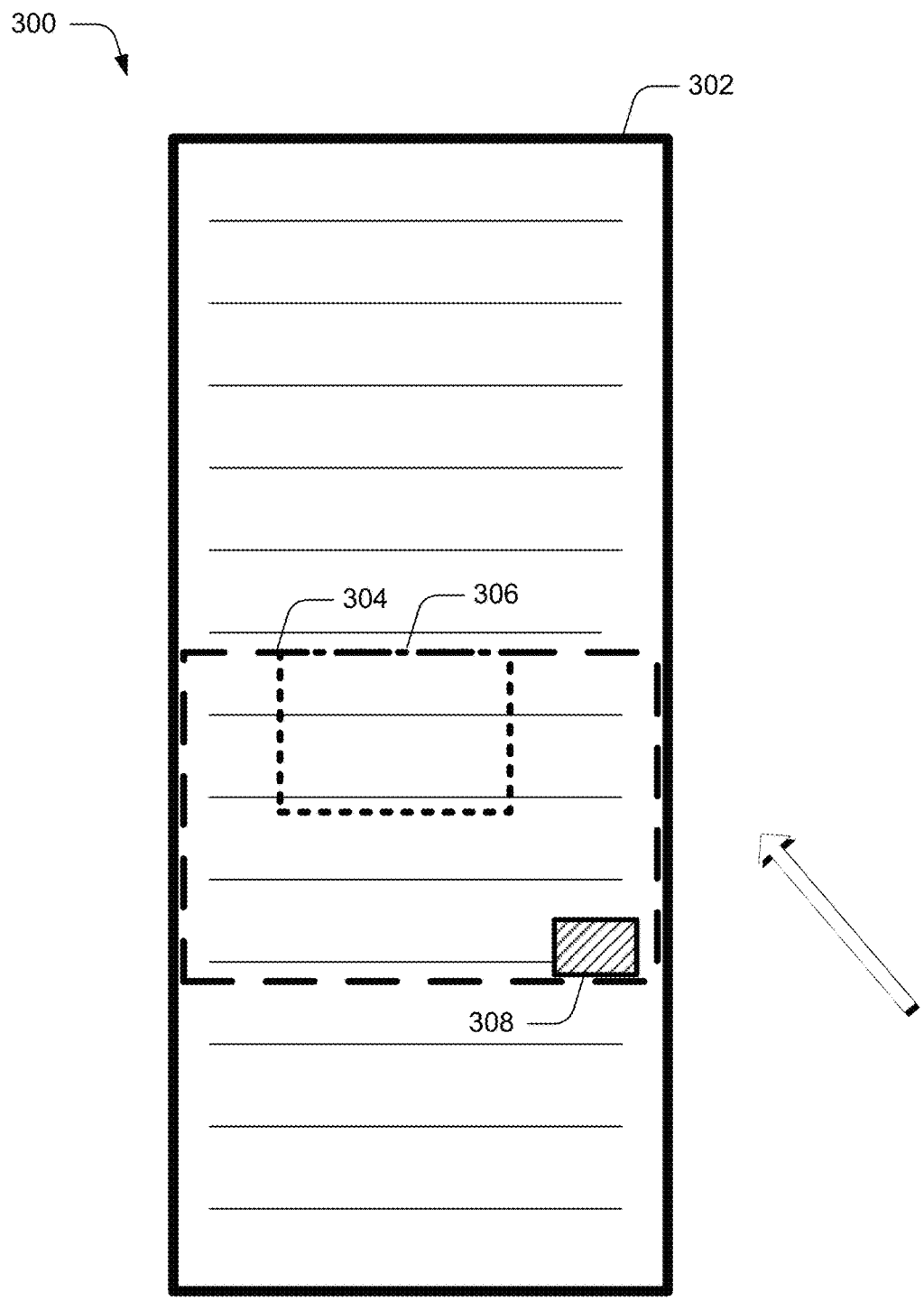
FIG. 9 illustrates a view of a renderable document illustrating a layout viewport and a visual viewport in accordance with one or more embodiments.
Figure 10:
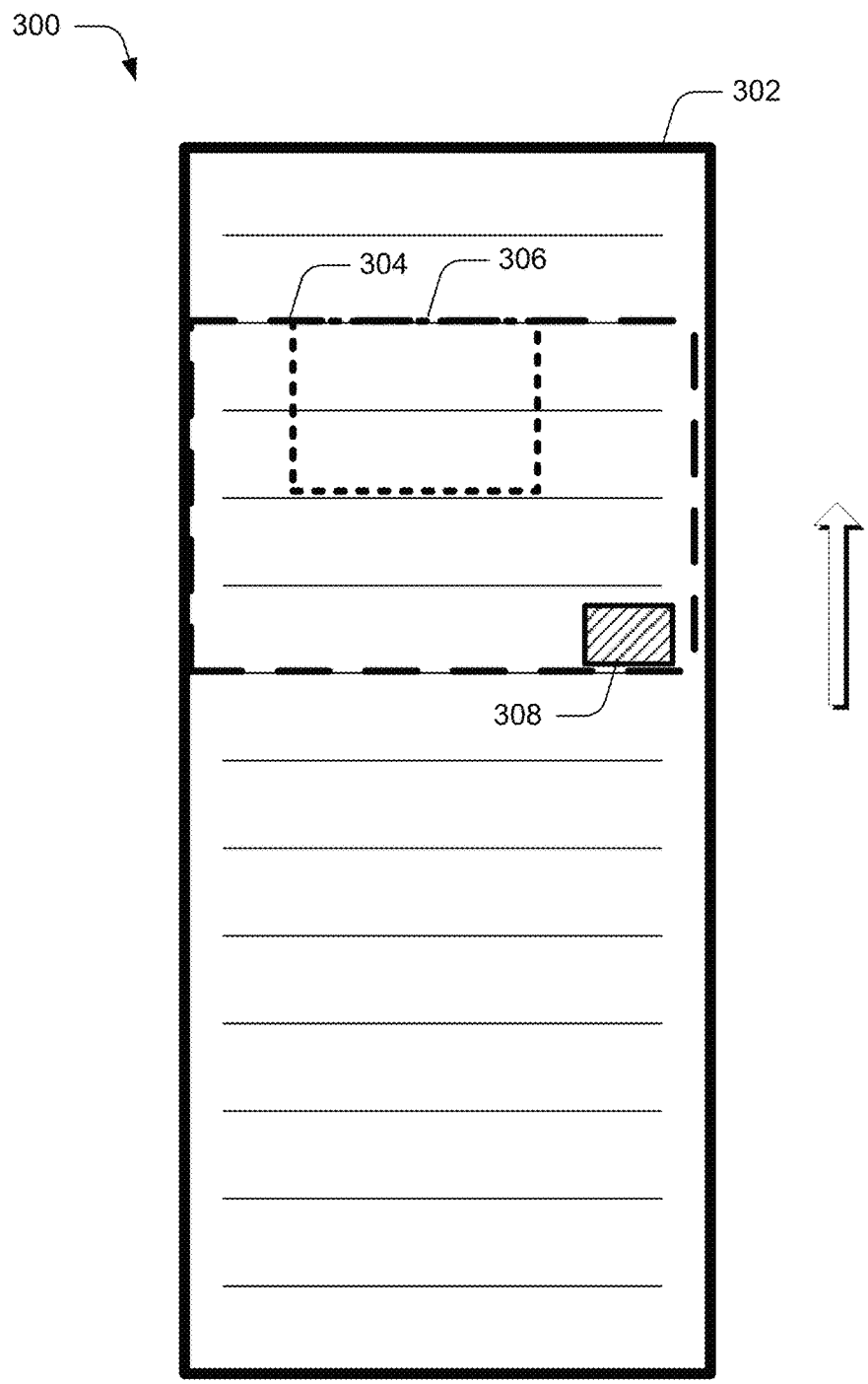
FIG. 10 illustrates a view of a renderable document illustrating a layout viewport and a visual viewport in accordance with one or more embodiments.

Referring to FIG. 9, the visual viewport 306 has been panned to the left and upwardly such that the top of the visual viewport 306 is coextensive with the top of the layout viewport 304. In this example, no scroll events have been fired and the scroll offset does not change. Assume now, that the user continues to move the visual viewport 306 upwardly. As an example, consider FIG. 10.

There, the user has moved the visual viewport 306 upwardly in the direction of the arrow. As a result, and because the visual viewport 306 is configured to not extend outside of the layout viewport 304, the layout viewport 304 is moved or dragged along with the visual viewport 306. Because the visual viewport 306 has scrolled upwardly through the content, scroll events are fired and the scroll offset is updated. In addition, the position of the fixed position element 308 is updated relative to the layout viewport 304. Again, this occurs through updates to the DOM.

Figure 11:
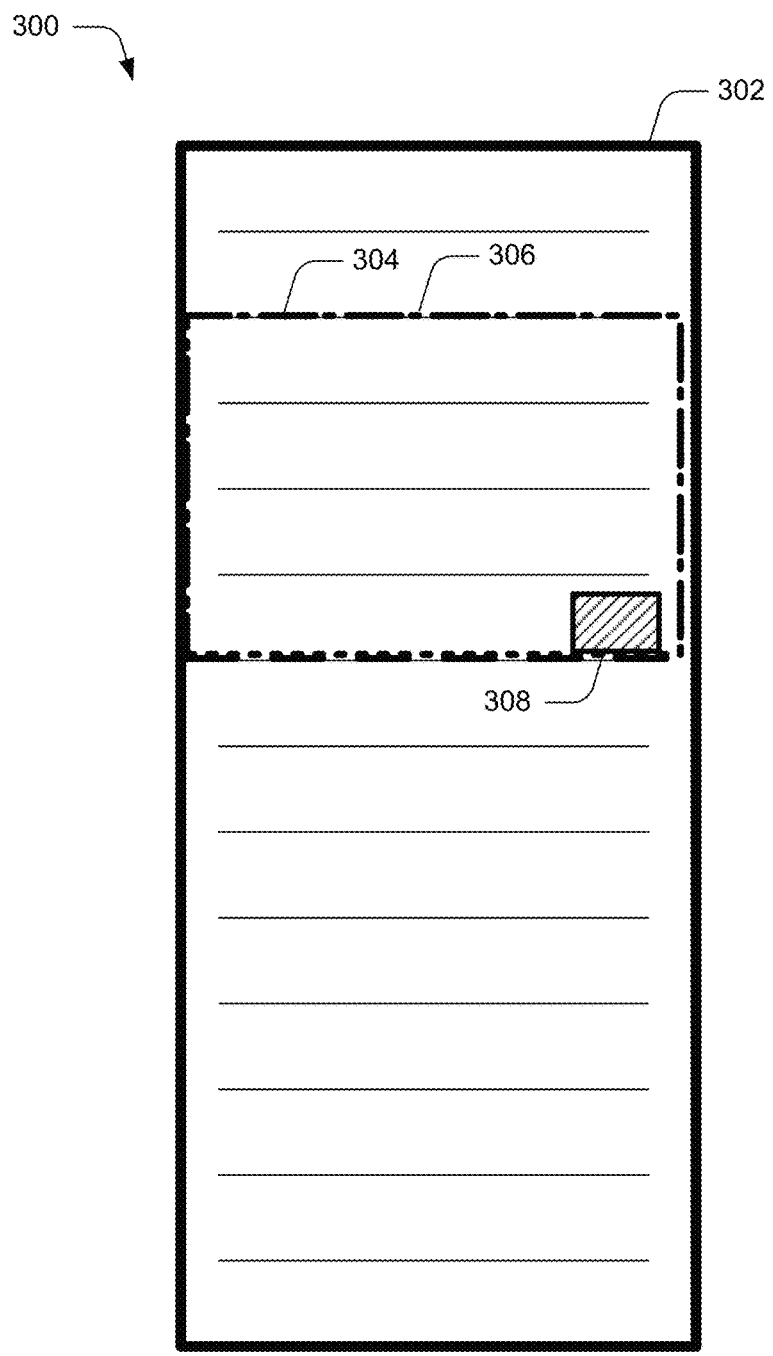
FIG. 11 illustrates a view of a renderable document illustrating a layout viewport and a visual viewport in accordance with one or more embodiments.

Referring to FIG. 11, the visual viewport 306 has been zoomed out to again be coextensive with layout viewport 304. As such, the fixed position element 308 is now visible.

As noted above, in one or more embodiments, viewports can be modified independently. For example, the size of the visual viewport can be modified to accommodate overlay user interfaces, such as on-screen touch keyboards as well as other overlay user interfaces such as "Find on the Page" mechanisms and the like. Further, notifications can be implemented as an overlay user interface in which the visual viewport is modified to accommodate the notification or notifications. This can enable additional scenarios such as touch input within fixed elements, and panning/zooming fixed elements while the keyboard is visible. As an example, consider FIG. 12.

There, an on-screen touch keyboard has been presented. In this particular example, to accommodate presentation of the keyboard, visual viewport 306 has been resized to roughly half the size of layout viewport 304. Doing so, as will become apparent below, allows panning to the full area of the document while the keyboard is presented. Notice in this example, that while the visual viewport 306 has been resized, the layout viewport 304 remains the same. Using this approach, dismissing the keyboard will not place the visible region outside of the 100% zoom rectangle. In this particular example, presentation of the keyboard does not cause scrolling or panning.

Figure 12:
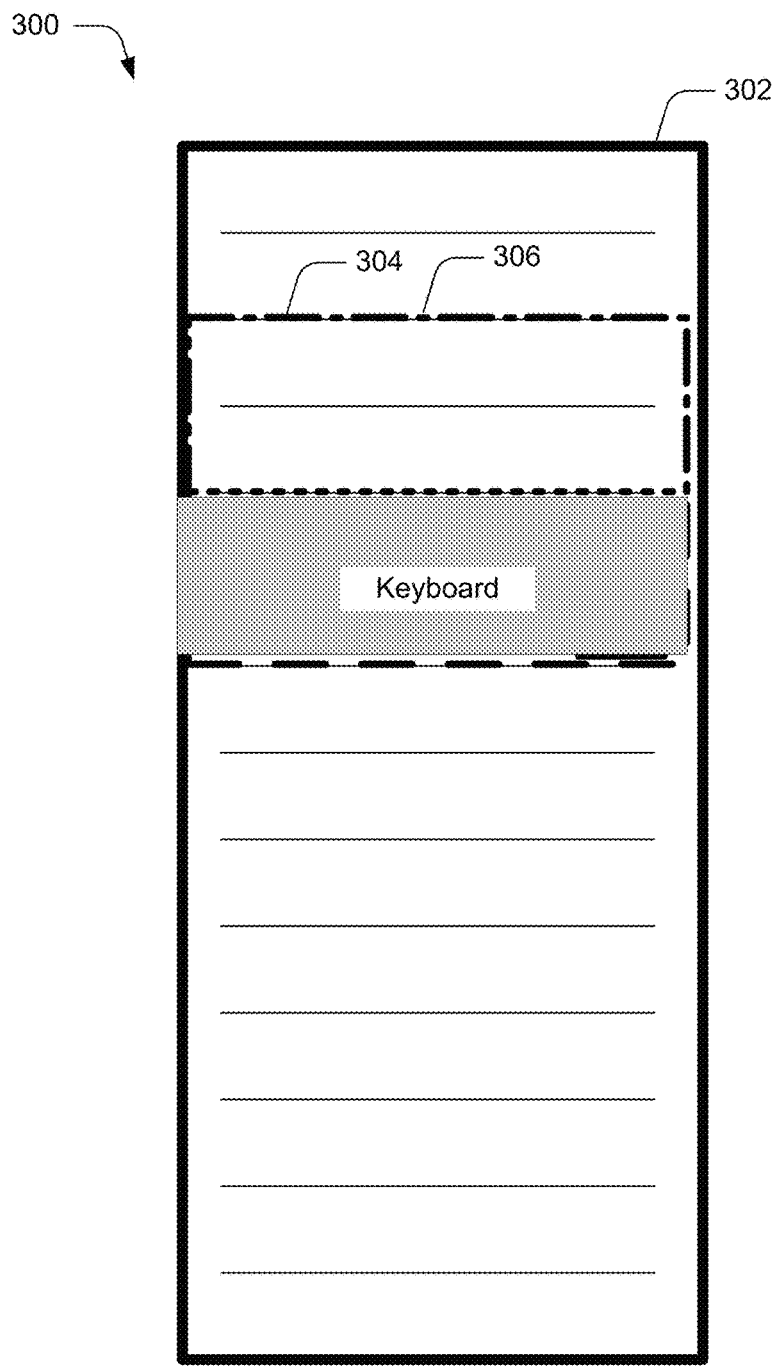
FIG. 12 illustrates a view of a renderable document illustrating a layout viewport and a visual viewport in accordance with one or more embodiments.
Figure 13:
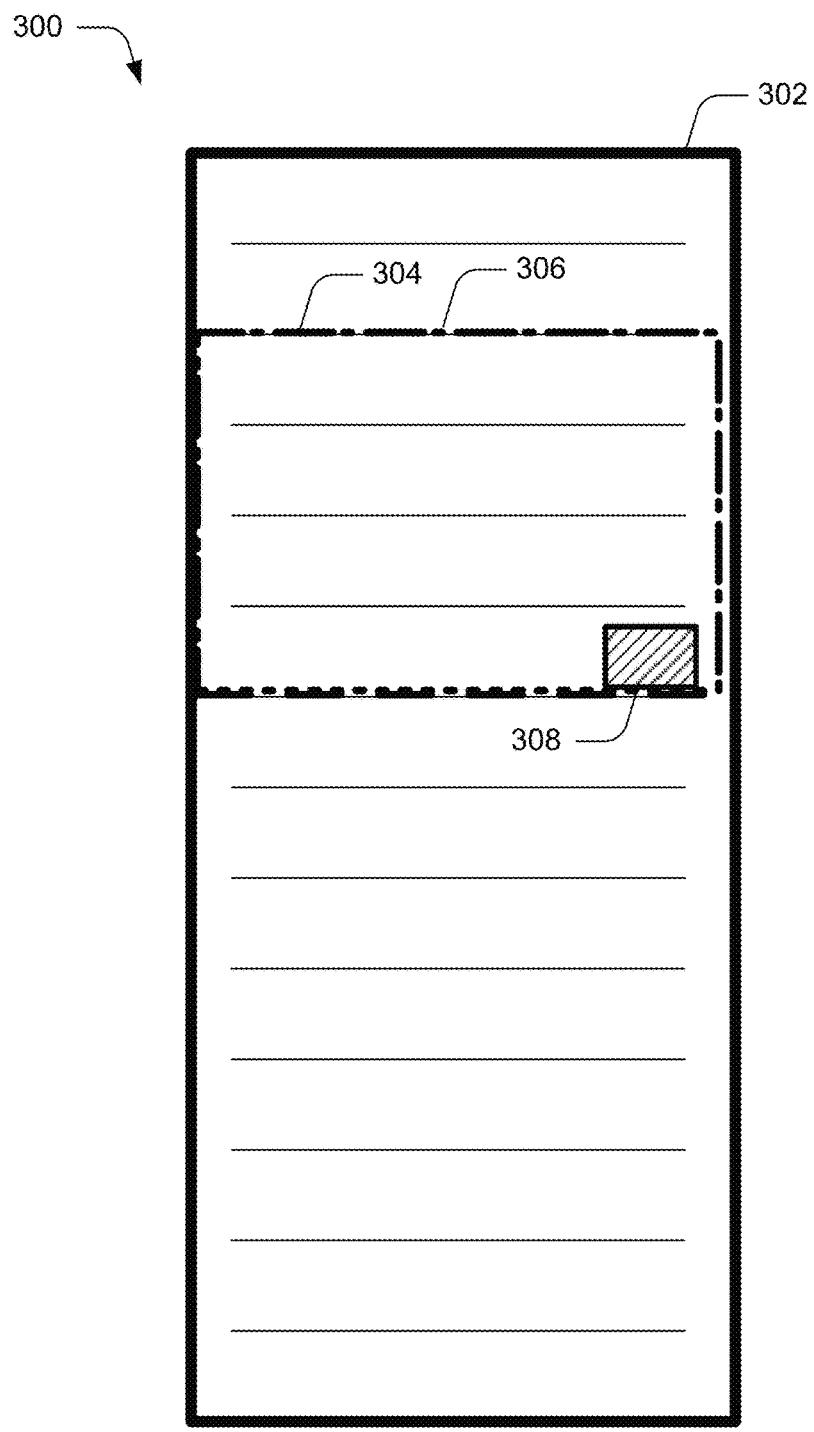
FIG. 13 illustrates a view of a renderable document illustrating a layout viewport and a visual viewport in accordance with one or more embodiments.

Referring to FIG. 13, the keyboard from FIG. 12 has been dismissed. Notice that, responsive to dismissing the keyboard, the visual viewport 306 has been resized to be coextensive with the layout viewport 304. This state is effectively the same state as illustrated in FIG. 3 before an initial zoom operation. In this example, no scroll events have fired, nor has the scroll offset been updated.

Figure 14:
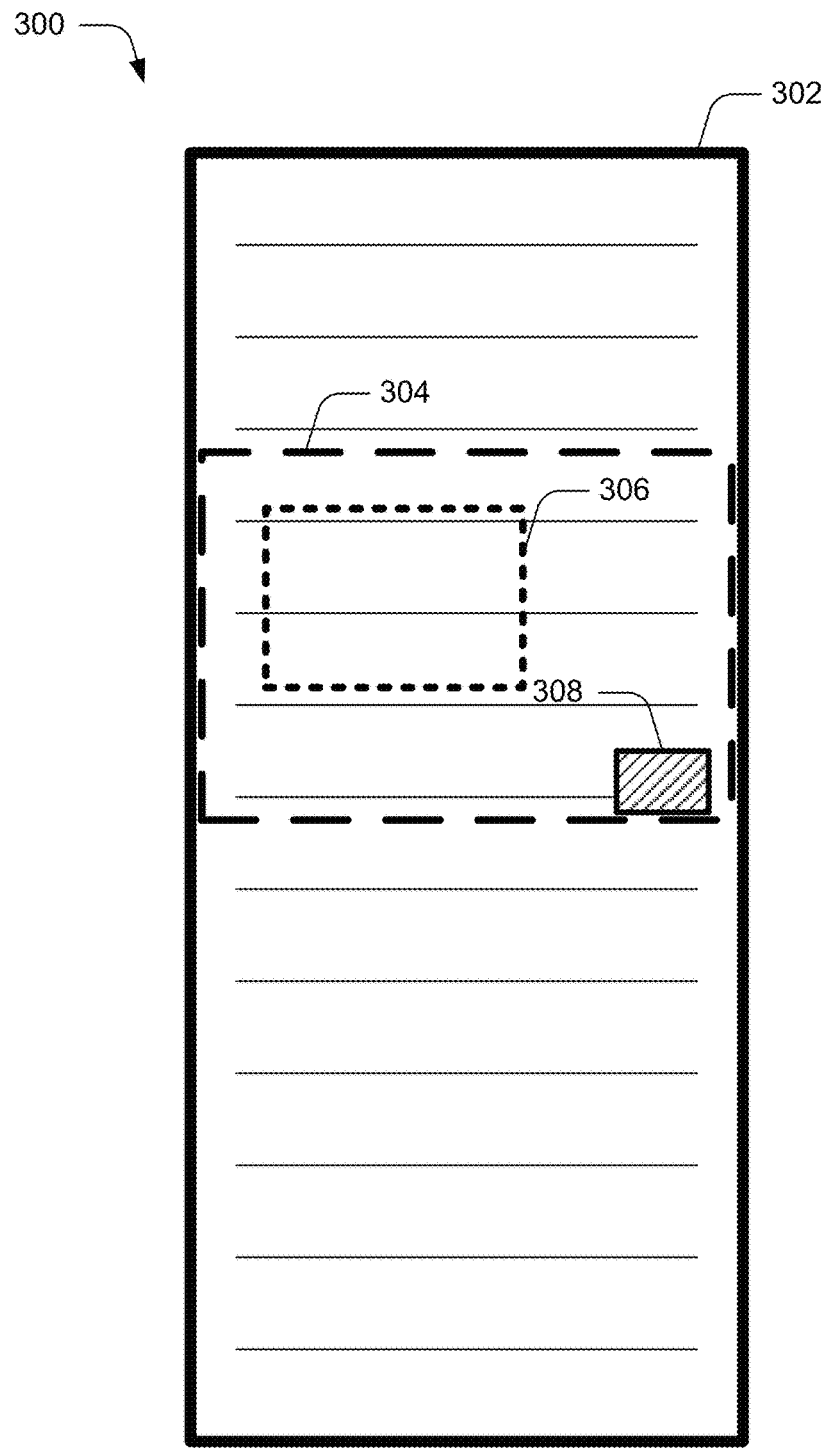
FIG. 14 illustrates a view of a renderable document illustrating a layout viewport and a visual viewport in accordance with one or more embodiments.

Referring to FIG. 14, the visual viewport 306 has been zoomed in a similar fashion as that described above. Notice that the fixed position element 308 is not in view. No scroll events have been fired, nor has the scroll offset been updated.

Figure 15:
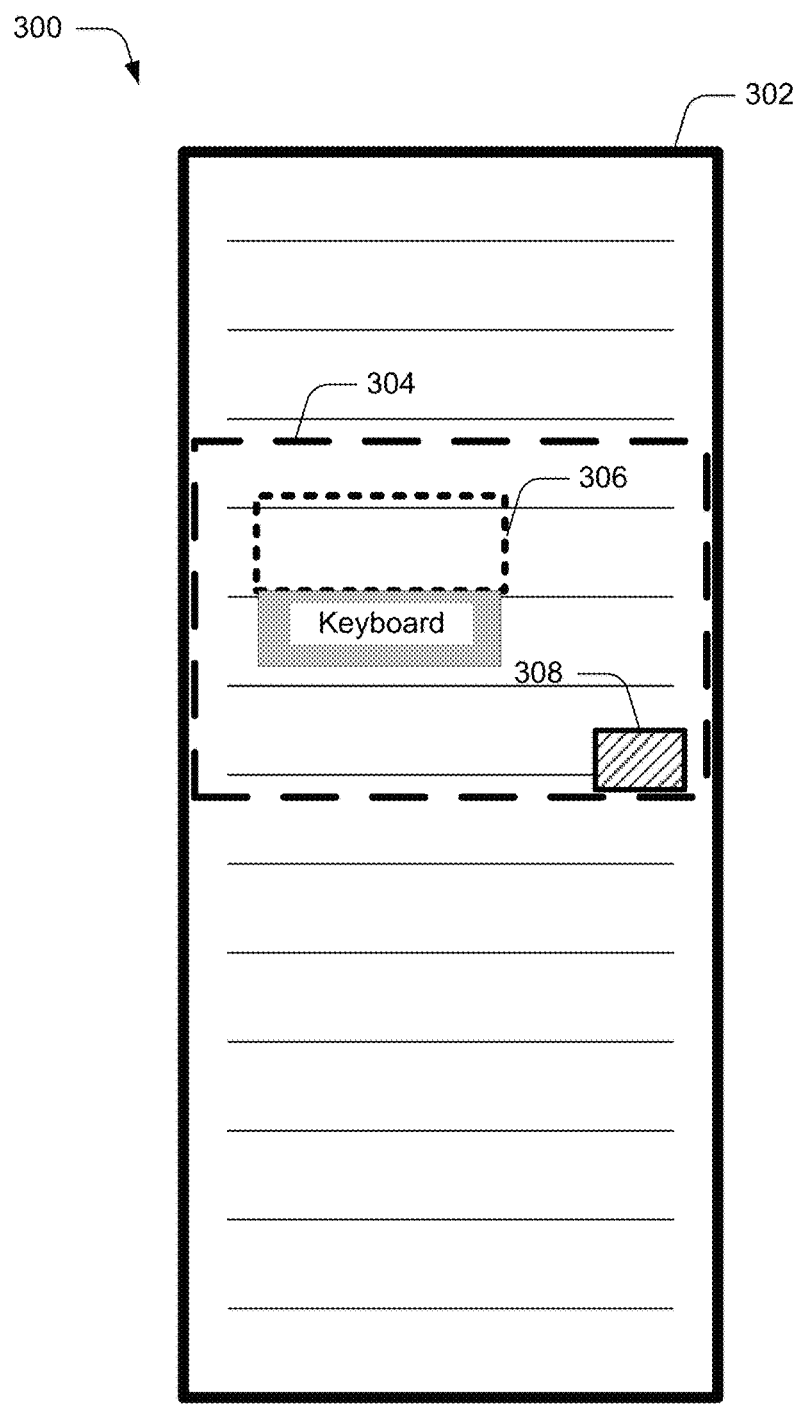
FIG. 15 illustrates a view of a renderable document illustrating a layout viewport and a visual viewport in accordance with one or more embodiments.

Referring to FIG. 15, the keyboard has been presented which, in turn, has resized the visual viewport 306. No scroll events have been fired, nor has the scroll offset been updated.

Figure 16:
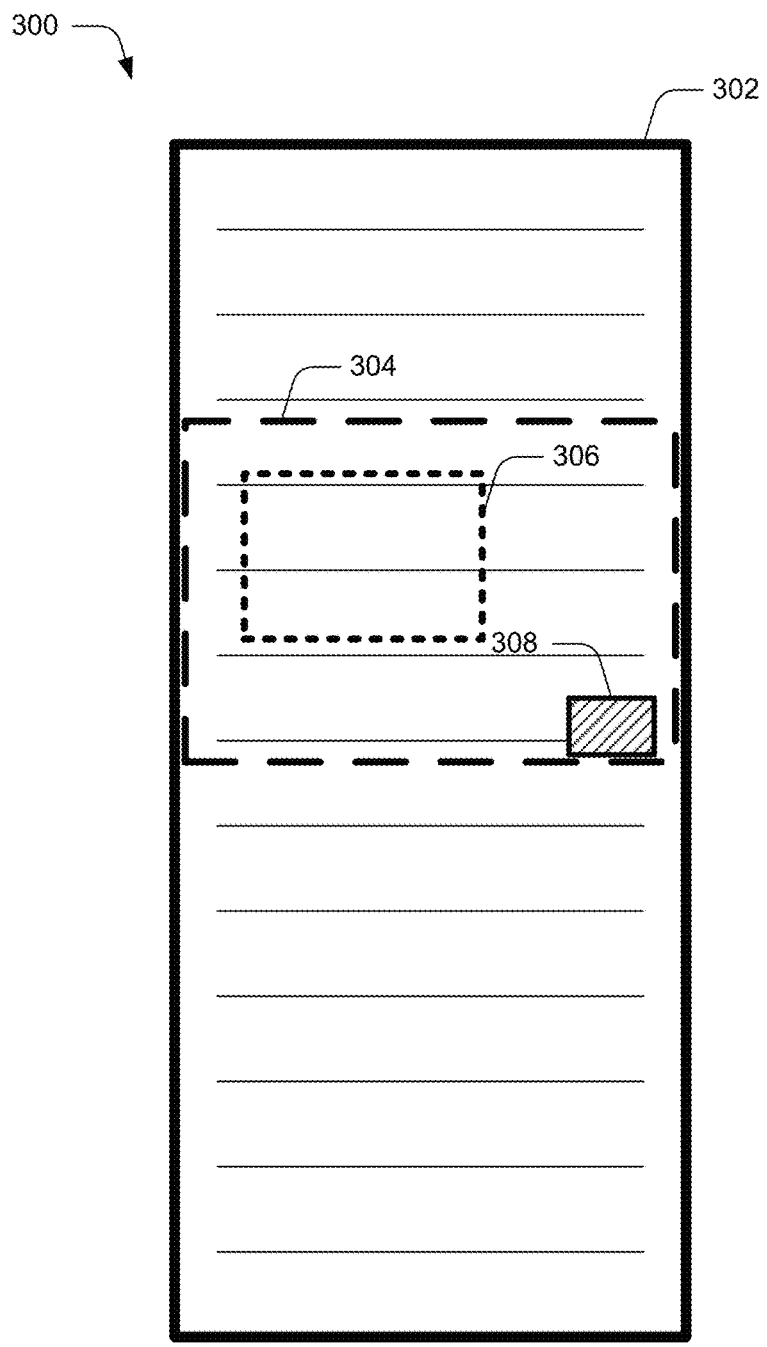
FIG. 16 illustrates a view of a renderable document illustrating a layout viewport and a visual viewport in accordance with one or more embodiments.

Referring to FIG. 16, the keyboard has been dismissed and the visual viewport 306 has been resized into its original zoomed size. No scroll events have been fired, nor has the scroll offset been updated.

Figure 17:
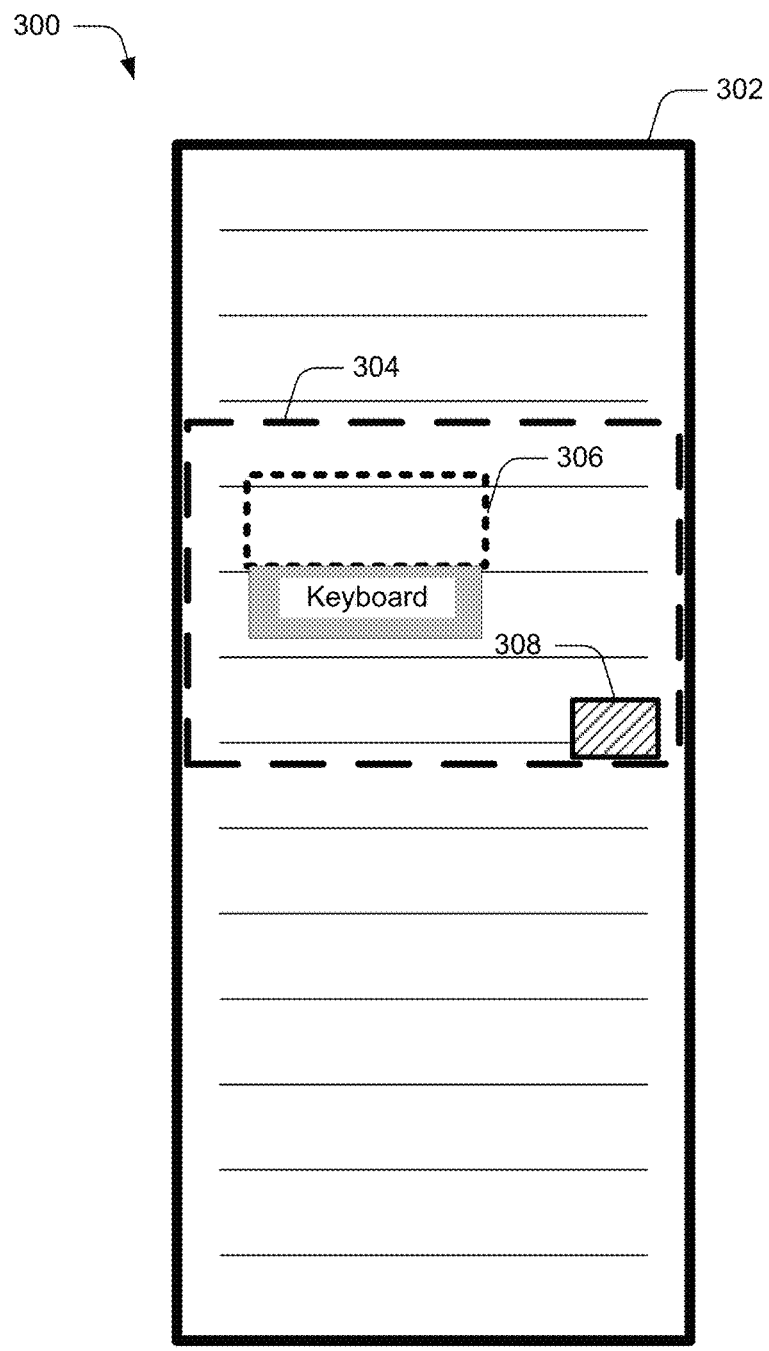
FIG. 17 illustrates a view of a renderable document illustrating a layout viewport and a visual viewport in accordance with one or more embodiments.

Referring to FIG. 17, the keyboard has again been presented which, in turn, has resized the visual viewport 306. No scroll events have been fired, nor has the scroll offset been updated.

Figure 18:
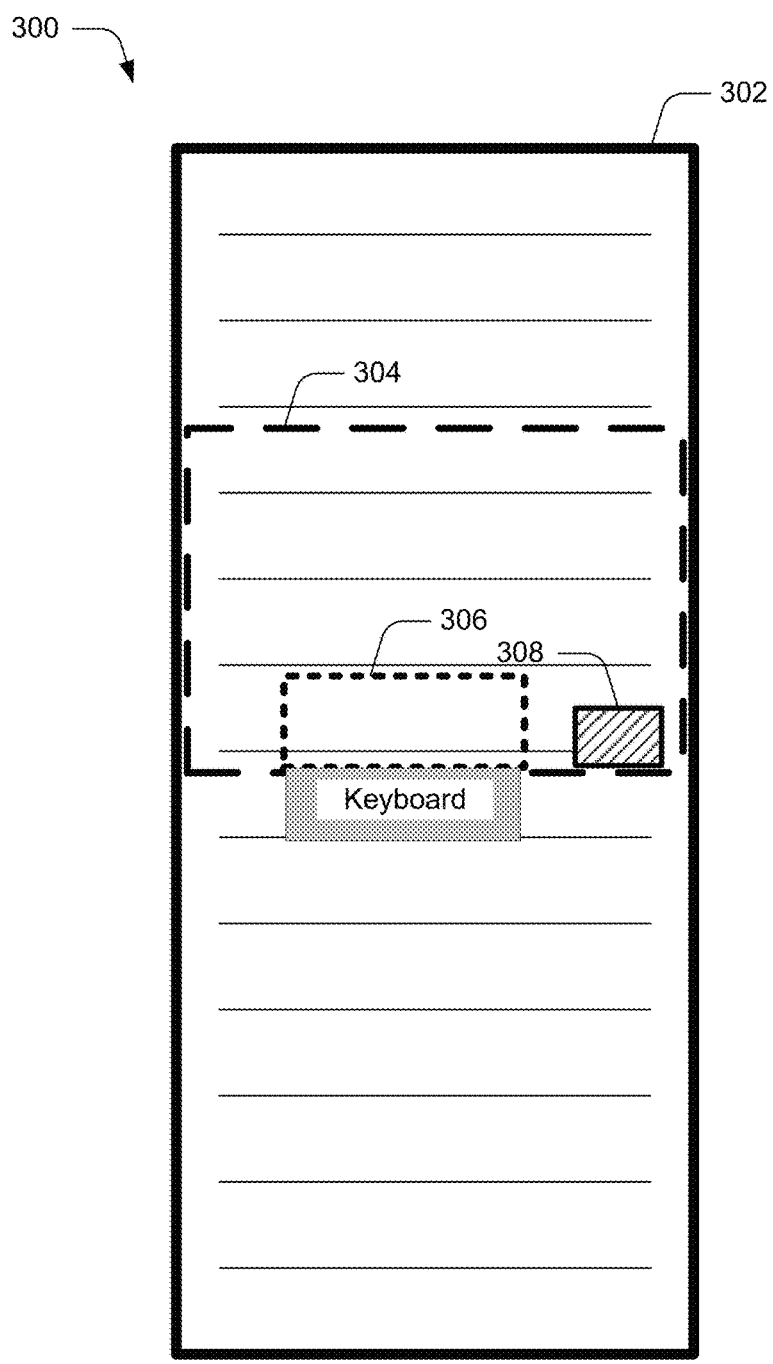
FIG. 18 illustrates a view of a renderable document illustrating a layout viewport and a visual viewport in accordance with one or more embodiments.

Referring to FIG. 18, the visual viewport 306 has been moved downwardly such that the bottom of the visual viewport 306 is coextensive with the bottom of the layout viewport 304. Here, because the visual viewport 306 has not yet been moved to a location which would otherwise clip or extend outside of the layout viewport 304, no scroll events have been fired, nor has the scroll offset been updated.

Figure 19:
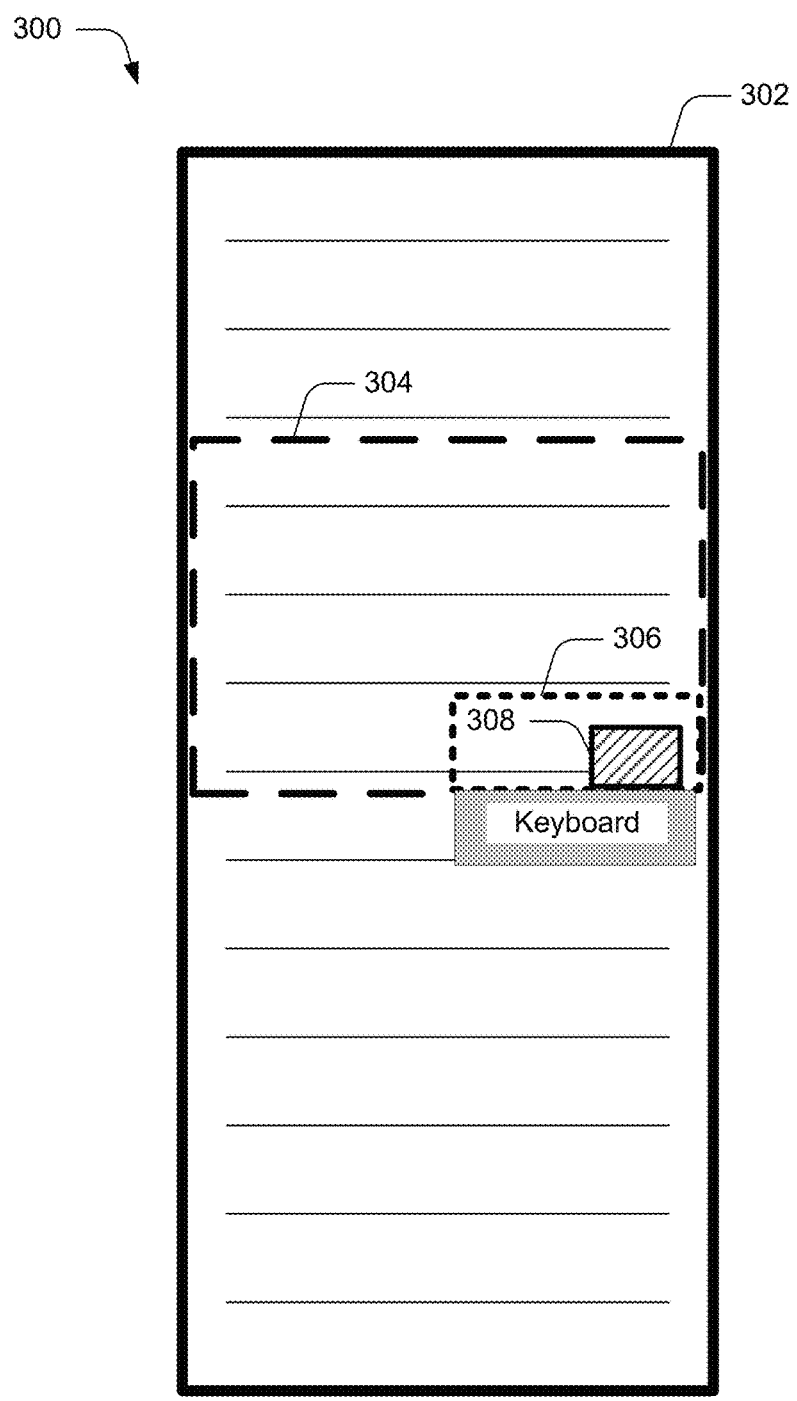
FIG. 19 illustrates a view of a renderable document illustrating a layout viewport and a visual viewport in accordance with one or more embodiments.

Referring to FIG. 19, the visual viewport 306 has been moved to the right to bring the fixed position element 308 into view. Note, in this example, that the keyboard can be utilized to enter text into the fixed position element 308. Now, it becomes evident why, in at least some embodiments, resizing the visual viewport 306 is desirable. Consider the situation in which the visual viewport 306 is not resized to accommodate the keyboard. In this particular instance, if the un-resized visual viewport were to be moved to a location relative to the layout viewport over the fixed position element 308, the keyboard would obscure the fixed position element 308 and thus, a user would not be able to enter text into the fixed position element. Accordingly, resizing the visual viewport can enable, in instances such as these and others, a user to relocate the visual viewport 306 to bring a fixed position element 308 into view and, to meaningfully interact with the fixed position element 308 utilizing an overlay user interface such as a keyboard.

Figure 20:
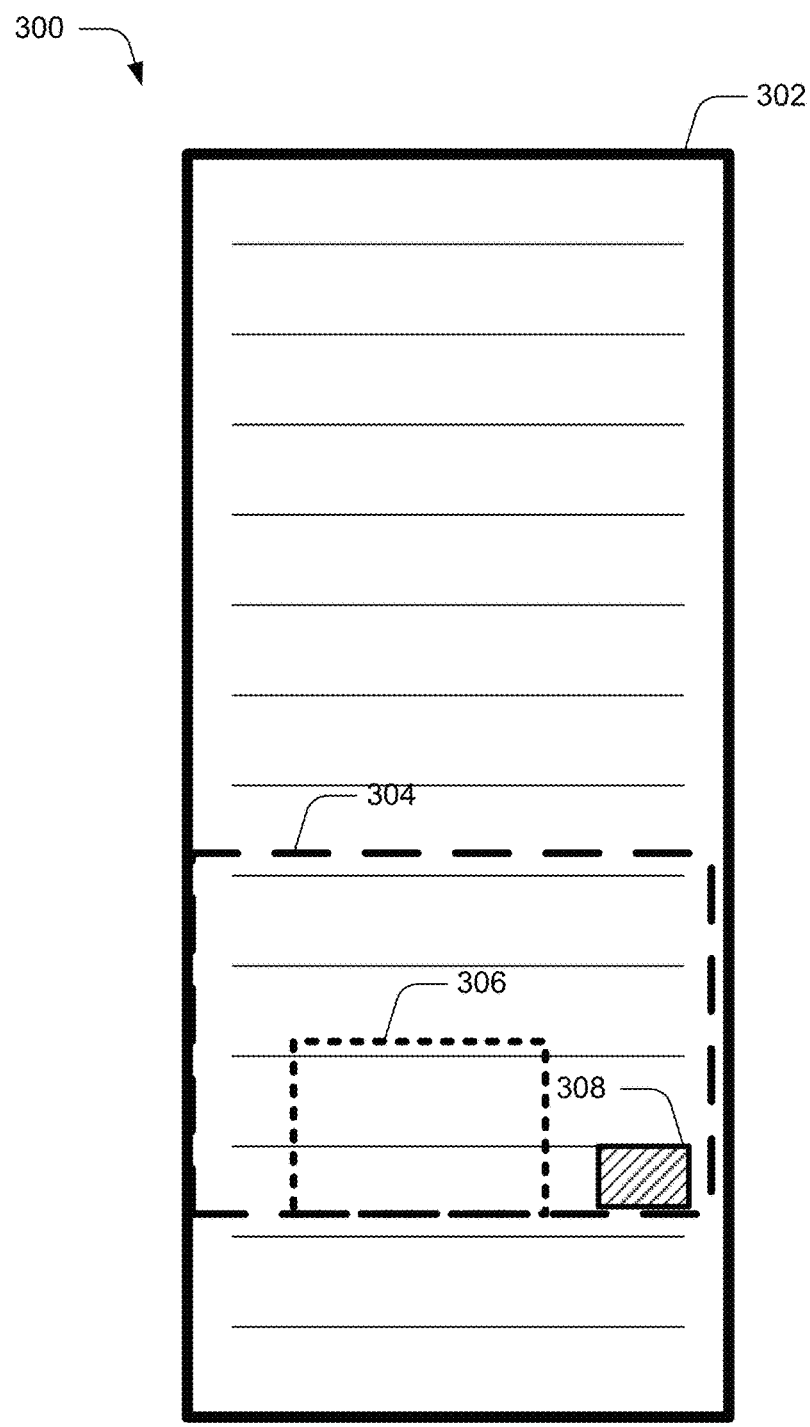
FIG. 20 illustrates a view of a renderable document illustrating a layout viewport and a visual viewport in accordance with one or more embodiments.

Referring to FIG. 20, the FIG. 19 keyboard has been dismissed and the visual viewport 306 has been panned to the left and moved downwardly, thus moving or dragging the layout viewport 304 along with it. Accordingly, scroll events have been fired and the scroll offset has been updated.

Having considered examples of layout viewports and visual viewports, and their interaction in accordance with one or more embodiments, consider now the following example methods.

Example Method

Figure 21:
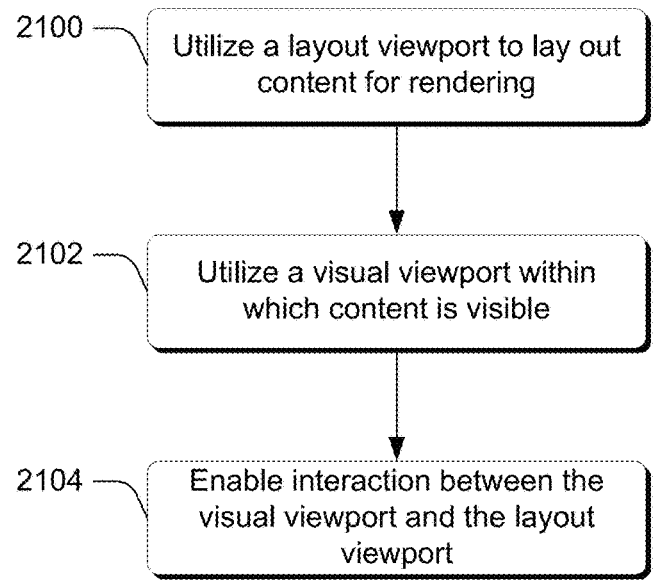
FIG. 21 is a flow diagram that describes steps in a method in accordance with one or more embodiments.

FIG. 21 is a flow diagram that describes steps in a method accordance with one or more embodiments. The method can be performed in connection with any suitable hardware, software, firmware, or combination thereof. In at least some embodiments, the method can be performed by software, e.g., an application such as a web browser or other application, embodied on some type of computer-readable storage medium.

Step 2100 utilizes a layout viewport to layout content for rendering. Any suitable type of layout viewport can be utilized, examples of which are provided above. Step 2102 utilizes a visual viewport within which content is visible to the user. Any suitable visual viewport can be utilized, examples of which are provided above. Step 2104 enables interaction between the visual viewport and the layout viewport. Examples of interactions are provided above. In the illustrated and described embodiments, the visual viewport is separate from the layout viewport and is freely manipulable relative to the layout viewport. For example, the visual viewport can be zoomed in and zoomed out within the layout viewport. Yet other interactions can include interactions via the visual viewport which cause actions to be performed relative to the layout viewport. For example, actions relative to the visual viewport can cause scrolling events to be fired which, in turn, causes the layout viewport to change. For example, based on a user's interaction with the visual viewport, the layout viewport may be moved or dragged along with the visual viewport as described above.

Further, interactions between the visual viewport and layout viewport can impact or otherwise include fixed position elements or fixed position backgrounds, as described above. For example, such interactions can cause fixed position elements to be re-located along with the layout viewport when, for example, the visual viewport causes the layout viewport to be moved.

Figure 22:
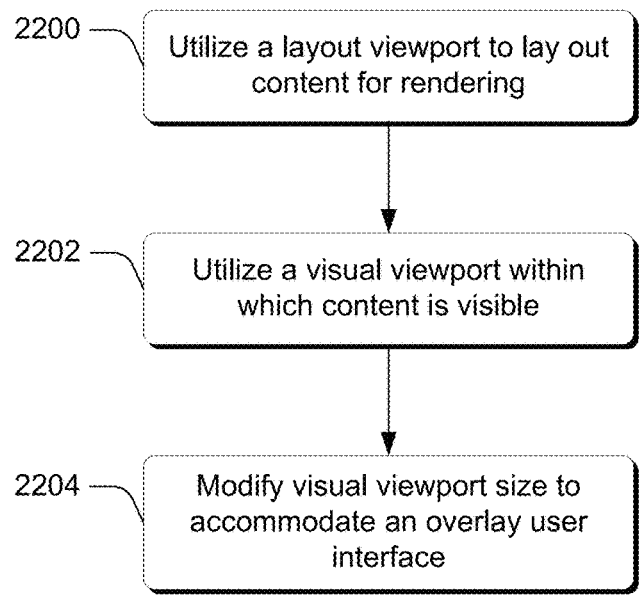
FIG. 22 is a flow diagram that describes steps in a method in accordance with one or more embodiments.

FIG. 22 is a flow diagram that describes steps in a method accordance with one or more embodiments. The method can be performed in connection with any suitable hardware, software, firmware, or combination thereof. In at least some embodiments, the method can be performed by software, e.g., an application such as a web browser or other application, embodied on some type of computer-readable storage medium.

Step 2200 utilizes a layout viewport to layout content for rendering. Any suitable type of layout viewport can be utilized, examples of which are provided above. Step 2202 utilizes a visual viewport within which content is visible to the user. Any suitable visual viewport can be utilized, examples of which are provided above. Step 2204 modifies the visual viewport size to accommodate an overlay user interface. Any suitable type of overlay user interface can be utilized. For example, in at least some embodiments an overlay user interface in the form of an on-screen, touch keyboard can be utilized. It is to be appreciated and understood, however, that other overlay user interfaces can be utilized without departing from the spirit and scope of the claimed subject matter.

Having described example methods in accordance with one or more embodiments, consider now a discussion of an example device that can be utilized to implement the embodiments described above.

Example Device

Figure 23:
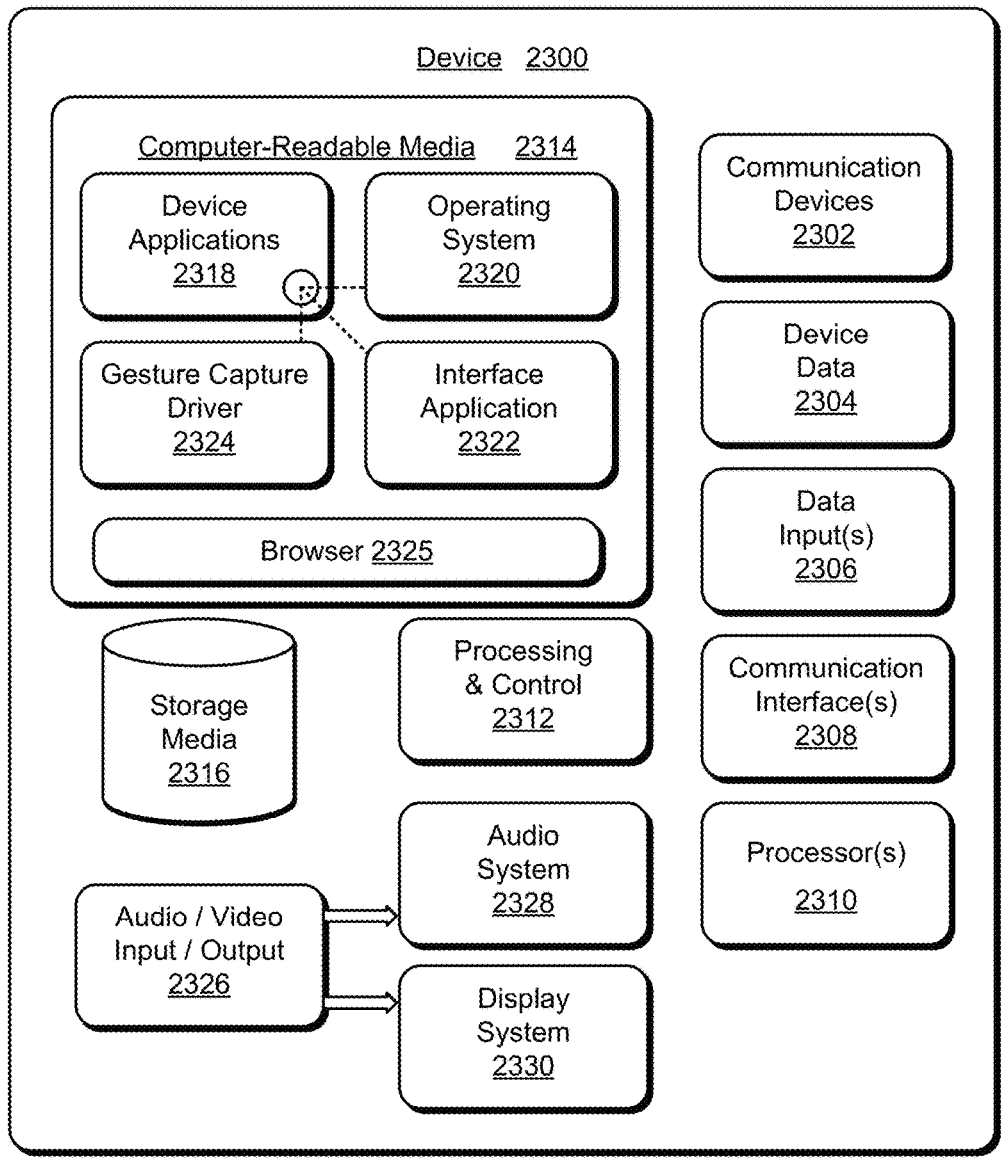
FIG. 23 illustrates an example computing device that can be utilized to implement various embodiments described herein.

FIG. 23 illustrates various components of an example device 2300 that can be implemented as any type of portable and/or computer device as described with reference to FIGS. 1 and 2 to implement the embodiments described herein. Device 2300 includes communication devices 2302 that enable wired and/or wireless communication of device data 2304 (e.g., received data, data that is being received, data scheduled for broadcast, data packets of the data, etc.). The device data 2304 or other device content can include configuration settings of the device, media content stored on the device, and/or information associated with a user of the device. Media content stored on device 2300 can include any type of audio, video, and/or image data. Device 2300 includes one or more data inputs 2306 via which any type of data, media content, and/or inputs can be received, such as user-selectable inputs, messages, music, television media content, recorded video content, and any other type of audio, video, and/or image data received from any content and/or data source.

Device 2300 also includes communication interfaces 2308 that can be implemented as any one or more of a serial and/or parallel interface, a wireless interface, any type of network interface, a modem, and as any other type of communication interface. The communication interfaces 2308 provide a connection and/or communication links between device 2300 and a communication network by which other electronic, computing, and communication devices communicate data with device 2300.

Device 2300 includes one or more processors 2310 (e.g., any of microprocessors, controllers, and the like) which process various computer-executable or readable instructions to control the operation of device 2300 and to implement the embodiments described above. Alternatively or in addition, device 2300 can be implemented with any one or combination of hardware, firmware, or fixed logic circuitry that is implemented in connection with processing and control circuits which are generally identified at 2312. Although not shown, device 2300 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2300 also includes computer-readable media 2314, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2300 can also include a mass storage media device 2316.

Computer-readable media 2314 provides data storage mechanisms to store the device data 2304, as well as various device applications 2318 and any other types of information and/or data related to operational aspects of device 2300. For example, an operating system 2320 can be maintained as a computer application with the computer-readable media 2314 and executed on processors 2310. The device applications 2318 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 2318 also include any system components or modules to implement embodiments of the techniques described herein. In this example, the device applications 2318 include an interface application 2322 and a gesture-capture driver 2324 that are shown as software modules and/or computer applications. The gesture-capture driver 2324 is representative of software that is used to provide an interface with a device configured to capture a gesture, such as a touchscreen, track pad, camera, and so on. Alternatively or in addition, the interface application 2322 and the gesture-capture driver 2324 can be implemented as hardware, software, firmware, or any combination thereof. In addition, computer readable media 2314 can include a web browser 2325 that functions as described above.

Device 2300 also includes an audio and/or video input-output system 2326 that provides audio data to an audio system 2328 and/or provides video data to a display system 2330. The audio system 2328 and/or the display system 2330 can include any devices that process, display, and/or otherwise render audio, video, and image data. Video signals and audio signals can be communicated from device 2300 to an audio device and/or to a display device via an RF (radio frequency) link, S-video link, composite video link, component video link, DVI (digital video interface), analog audio connection, or other similar communication link. In an embodiment, the audio system 2328 and/or the display system 2330 are implemented as external components to device 2300. Alternatively, the audio system 2328 and/or the display system 2330 are implemented as integrated components of example device 2300.

CONCLUSION

Various embodiments described above utilize a layout viewport and a visual viewport separate from the layout viewport. The layout viewport is utilized for such things as page layout operations and reporting Document Object Model values to script. The layout viewport can be thought of as an initial rectangle which is equivalent in size to the initial containing block. The initial containing block is a containing block that contains web content that is initially visible to the user. The visual viewport is separate from the layout viewport and is allowed to be freely manipulated relative to the layout viewport. For example, the visual viewport may "push" the layout viewport around when it collides with the layout viewport boundaries. The visual viewport can be thought of as the rectangle that is visible to the user.

In one or more embodiments, fixed elements are fixed to the layout viewport and the visual viewport can pan independently of the layout viewport. When the visual viewport reaches the edge of the layout viewport, the layout viewport can begin to pan with it.

In one or more embodiments, viewports can be modified independently. For example, the size of the visual viewport can be modified to accommodate overlay user interfaces such as on-screen touch keyboards. This can enable additional scenarios such as touch input within fixed elements, and panning/zooming fixed elements while the keyboard is visible.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer system, comprising:
one or more processors; and
one or more computer-readable hardware storage devices having stored thereon computer-executable instructions that are executable by the one or more processors to cause the computer system to render content on a display, and further to cause the computer system to perform at least the following:

create a layout viewport that identifies a portion of content of a web page that is available for display in a web browser and how the portion of content is to be laid out within the layout viewport, the portion of content including a fixed position user interface element that retains a fixed position within the layout viewport as the portion of content changes due to the layout viewport being scrolled over the content of the web page;

create a visual viewport that overlaps the layout viewport and that renders at least a part of the portion of content identified by the layout viewport, wherein the visual viewport is moveable and sizable within and independent of the layout viewport; and enable interaction between the visual viewport and the layout viewport, including:

rendering the fixed position user interface element on the display based at least on identifying that a size and a position of the visual viewport causes the visual viewport to overlap a portion of the layout viewport containing the fixed position user interface element;

subsequent to rendering the fixed position user interface element, detecting a condition in which an overlay user interface is to be displayed;

reducing the size of the visual viewport to accommodate a detected size of the overlay user interface; and rendering the overlay user interface instead of the fixed position user interface element, based at least on the reduced the size of the visual viewport causing it to no longer overlap the portion of the layout viewport containing the fixed position user interface element, and based at least on the overlay user interface overlapping the portion of the layout viewport containing the fixed position user interface element.

2. The computer system of claim 1, wherein content rendered based on the visual viewport is zoomable with respect to the portion of content identified by the layout viewport.

3. The computer system of claim 1, wherein any content identified by the layout viewport and which is not overlapped by the visual viewport is not visible.

4. The computer system of claim 1, wherein no boundary of the visual viewport extends outside a boundary of the layout viewport.

5. The computer system of claim 1, wherein movement of the visual viewport also causes the layout viewport to be moved.

6. The computer system of claim 1, wherein the overlay user interface comprises an on-screen touch keyboard.

7. The computer system of claim 1, wherein enabling interaction between the visual viewport and the layout viewport also includes rendering the fixed position user interface element subsequent to rendering the overlay user interface, based at least on detecting that a scroll event has caused the resized visual viewport to overlap the portion of the layout viewport containing the fixed position user interface element.

8. A method, implemented at a computer system that includes one or more processors, for rendering web page content, the method comprising:

creating a layout viewport that identifies a portion of content of a web page that is available for display in a web browser and how the portion of content is to be laid out within the layout viewport, the portion of content including a fixed position user interface element that retains a fixed position within the layout viewport as the portion of content changes due to the layout viewport being scrolled over the content of the web page;

creating a visual viewport that overlaps the layout viewport and that renders at least a part of the portion of content identified by the layout viewport, wherein the visual viewport is moveable and sizable within and independent of the layout viewport; and enabling interaction between the visual viewport and the layout viewport, including:

rendering the fixed position user interface element based at least on identifying that a size and a position of the visual viewport causes the visual viewport to overlap a portion of the layout viewport containing the fixed position user interface element;

subsequent to rendering the fixed position user interface element, detecting a condition in which an overlay user interface is to be displayed;

reducing the size of the visual viewport to accommodate a detected size of the overlay user interface; and rendering the overlay user interface instead of the fixed position user interface element, based at least on the reduced size of the visual viewport causing it to no longer overlap the portion of the layout viewport containing the fixed position user interface element, and based at least on the overlay user interface overlapping the portion of the layout viewport containing the fixed position user interface element.

9. The method of claim 8, wherein content rendered based on the visual viewport is zoomable with respect to the portion of content identified by the layout viewport.

10. The method of claim 8, wherein any content identified by the layout viewport and which is not overlapped by the visual viewport is not visible.

11. The method of claim 8, wherein no boundary of the visual viewport extends outside a boundary of the layout viewport.

12. The method of claim 8, wherein movement of the visual viewport also causes the layout viewport to be moved.

13. The method of claim 8, wherein the overlay user interface comprises an on-screen touch keyboard.

14. The method of claim 8, wherein enabling interaction between the visual viewport and the layout viewport also includes rendering the fixed position user interface element subsequent to rendering the overlay user interface, based at least on detecting that a scroll event has caused the resized visual viewport to overlap the portion of the layout viewport containing the fixed position user interface element.

15. A computer program product comprising hardware storage devices having stored thereon computer-executable instructions that are executable by one or more processors to cause a computer system to render content on a display, and further to cause the computer system to perform at least the following:

create a layout viewport that identifies a portion of content of a web page that is available for display in a web browser and how the portion of content is to be laid out within the layout viewport, the portion of content including a fixed position user interface element that retains a fixed position within the layout viewport as the portion of content changes due to the layout viewport being scrolled over the content of the web page;

create a visual viewport that overlaps the layout viewport and that renders at least a part of the portion of content identified by the layout viewport, wherein the visual viewport is moveable and sizable within and independent of the layout viewport; and enable interaction between the visual viewport and the layout viewport, including:

rendering the fixed position user interface element on the display based at least on identifying that a size and a position of the visual viewport causes the visual viewport to overlap a portion of the layout viewport containing the fixed position user interface element;

subsequent to rendering the fixed position user interface element, detecting a condition in which an overlay user interface is to be displayed;

reducing the size of the visual viewport to accommodate a detected size of the overlay user interface; and rendering the overlay user interface instead of the fixed position user interface element, based at least on the reduced the size of the visual viewport causing it to no longer overlap the portion of the layout viewport containing the fixed position user interface element, and based at least on the overlay user interface overlapping the portion of the layout viewport containing the fixed position user interface element.

16. The computer program product of claim 15, wherein content rendered based on the visual viewport is zoomable with respect to the portion of content identified by the layout viewport.

17. The computer program product of claim 15, wherein any content identified by the layout viewport and which is not overlapped by the visual viewport is not visible.

18. The computer program product of claim 15, wherein no boundary of the visual viewport extends outside a boundary of the layout viewport.

19. The computer program product of claim 15, wherein movement of the visual viewport also causes the layout viewport to be moved.

20. The computer program product of claim 15, wherein the overlay user interface comprises an on-screen touch keyboard.

21. The computer program product of claim 15, wherein enabling interaction between the visual viewport and the layout viewport also includes rendering the fixed position user interface element subsequent to rendering the overlay user interface, based at least on detecting that a scroll event has caused the resized visual viewport to overlap the portion of the layout viewport containing the fixed position user interface element.

* * * * *